(12) United States Patent
Kashiramoto

(10) Patent No.: US 12,461,169 B2
(45) Date of Patent: Nov. 4, 2025

(54) MEASUREMENT APPARATUS, MEASUREMENT METHOD, AND MEASUREMENT PROGRAM

(71) Applicant: SO BRAIN CO., LTD., Tokyo (JP)

(72) Inventor: Yorikazu Kashiramoto, Tokyo (JP)

(73) Assignee: SO BRAIN CO., LTD., Tokyo (JP)

( * ) Notice: Subject to any disclaimer, the term of this patent is extended or adjusted under 35 U.S.C. 154(b) by 0 days.

(21) Appl. No.: 18/834,816

(22) PCT Filed: Apr. 30, 2024

(86) PCT No.: PCT/JP2024/016652
§ 371 (c)(1),
(2) Date: Mar. 26, 2025

(87) PCT Pub. No.: WO2024/232310
PCT Pub. Date: Nov. 14, 2024

(65) Prior Publication Data
US 2025/0231254 A1     Jul. 17, 2025

(30) Foreign Application Priority Data
May 8, 2023    (JP) ................................. 2023-076502

(51) Int. Cl.
*G01R 31/52*     (2020.01)
(52) U.S. Cl.
CPC .................... *G01R 31/52* (2020.01)
(58) Field of Classification Search
CPC ................. G01R 31/28; G01R 31/52
See application file for complete search history.

(56) References Cited

U.S. PATENT DOCUMENTS

| | | | |
|---|---|---|---|
| 10,145,886 B2 | 12/2018 | Matsushit et al. | |
| 2010/0131215 A1* | 5/2010 | Kim | G01R 31/52 |
| | | | 702/58 |

(Continued)

FOREIGN PATENT DOCUMENTS

| | | |
|---|---|---|
| CN | 115166595 | 10/2022 |
| JP | 05-077784 | 10/1993 |

(Continued)

OTHER PUBLICATIONS

Notice of Reasons for Refusal Office Action issued in Japanese Pat. Appl. No. 2023-196686, dated Jan. 9, 2024, along with an English translation thereof.

(Continued)

*Primary Examiner* — Lee E Rodak
*Assistant Examiner* — Demetrius R Pretlow
(74) *Attorney, Agent, or Firm* — GREENBLUM & BERNSTEIN, P.L.C

(57) ABSTRACT

A measurement apparatus includes a measurement unit having two or more of a first measurement unit configured to measure an electricity related value of a wireway branched from a wireway to be measured to which a star-connected three-phase AC power source is connected, a second measurement unit configured to measure an electricity related value of a wireway branched from a wireway to be measured to which a star-connected three-phase AC power source is connected, a third measurement unit configured to measure an electricity related value of a wireway branched from a wireway to be measured to which a delta-connected three-phase AC power source is connected, and a fourth measurement unit configured to measure an electricity related value of a wireway branched from a wireway to be measured to which a delta-connected three-phase AC power source is connected, and a selection pro- (Continued)

cessor configured to select any one of the measurement units.

5 Claims, 19 Drawing Sheets

(56) References Cited

U.S. PATENT DOCUMENTS

| | | | | |
|---|---|---|---|---|
| 2016/0301201 | A1* | 10/2016 | Hahn | H02H 3/33 |
| 2017/0307675 | A1* | 10/2017 | Matsushita | G01R 31/52 |

FOREIGN PATENT DOCUMENTS

| | | |
|---|---|---|
| JP | 2000-037010 | 2/2000 |
| JP | 2002-243787 | 8/2002 |
| JP | 2006-138691 | 6/2006 |
| JP | 2010-249747 | 11/2010 |
| JP | 2011-015583 | 1/2011 |
| JP | 2011-027449 | 2/2011 |
| JP | 2011-058826 | 3/2011 |
| JP | 2011-153910 | 8/2011 |
| JP | 2016-114437 | 6/2016 |
| JP | 2018-004596 | 1/2018 |
| JP | 2018-155535 | 10/2018 |
| JP | 2019-148498 | 9/2019 |
| JP | 2021-162234 | 10/2021 |
| JP | 2022-166121 | 11/2022 |
| KR | 10-2008-0015604 | 2/2008 |
| TW | I221906 | 6/1991 |
| TW | 201621331 | 6/2016 |
| WO | 02/101397 | 12/2002 |

OTHER PUBLICATIONS

Office Action issued in Taiwanese Pat. Appl. No. 113100272, dated Jan. 26, 2024.
Office Action issued in Taiwanese Pat. Appl. No. 113113481, dated Jun. 28, 2024.
International Search Report issued in International Pat. Appl. No. PCT/JP2024/016652, dated Jul. 16, 2024.
Decision to grant a patent dated Jul. 2, 2024 issued in Japanese Pat. Appl. No. 2024-090490, along with an English translation thereof.
Office Action dated Jan. 31, 2025 issued in Korean Patent Application No. 10-2024-7025640 along with corresponding English translation.
Extended European search report dated May 16, 2025 issued in European patent application No. 24745878.9.

* cited by examiner

MEASUREMENT APPARATUS, MEASUREMENT METHOD, AND MEASUREMENT PROGRAM

TECHNICAL FIELD

The present disclosure relates to a measurement apparatus, a measurement method, and a measurement program for measuring a value related to electricity of a wireway.

BACKGROUND ART

A system for supplying electricity to each home or factory includes a three-phase AC system (hereinafter referred to as a three-phase system) and a single-phase AC system (hereinafter referred to as a single-phase system). The single-phase system is a system often used in general homes where a voltage is low and a high voltage is not required because the number of wires is small. Since the three-phase system can obtain the same power with smaller current than that in the single-phase system, is a system often used in, for example, factories where much electricity is used, with less electric loss because the same power can be obtained with a smaller current than that in the single-phase system.

In, e.g., a factory where a three-phase AC power source is used, in a case where an apparatus to be driven with a single-phase power is used, it is necessary to convert a three-phase power into a single-phase power and distribute the single-phase power. Patent Document 1 discloses a technique of converting a three-phase AC output from a three-phase three-wire AC power source into a single-phase AC by a phase conversion transformer. It is important to measure a value (hereinafter referred to as a wireway electricity related value) related to electricity of a wireway and check whether or not the wireway electricity related value is within a normal range in order to constantly ensure safety.

CITATION LIST

Patent Document

Patent Document 1: Japanese Unexamined Patent Publication No. 2021-162234

SUMMARY OF THE INVENTION

Technical Problems

Here, even in a case where the three-phase power is converted into the single-phase power and the single-phase power is distributed as described above, there is a demand for accurately measuring the wireway electricity related value.

It is an object of the present disclosure to provide a measurement apparatus, a measurement method, and a measurement program capable of accurately measuring a wireway electricity related value of a single-phase circuit in a case where a three-phase power is converted into a single-phase power and the single-phase power is distributed and a load is disposed on the single-phase circuit.

Solution to the Problems

In order to achieve the objective, the present disclosure provides the following configurations.

(1) A measurement apparatus includes a measurement unit including any two or more of a first measurement unit configured to measure, by a first configuration, a wireway electricity related value which is a value related to electricity of a wireway branched from a wireway to be measured to which a star-connected three-phase AC power source is connected and branched from a three-phase AC to a single-phase AC and distributed, a second measurement unit configured to measure, by a second configuration, a wireway electricity related value which is a value related to electricity of a wireway branched from a wireway to be measured to which a star-connected three-phase AC power source is connected and branched from a three-phase AC to a single-phase AC and distributed, a third measurement unit configured to measure, by a third configuration, a wireway electricity related value which is a value related to electricity of a wireway branched from a wireway to be measured to which a delta-connected three-phase AC power source is connected and branched from a three-phase AC to a single-phase AC and distributed, and a fourth measurement unit configured to measure, by a fourth configuration, a wireway electricity related value which is a value related to electricity of a wireway branched from a wireway to be measured to which a delta-connected three-phase AC power source is connected and branched from a three-phase AC to a single-phase AC and distributed, and a selection processor configured to select any one of the measurement units in the measurement unit.

(2) The selection processor
selects the first measurement unit in a case of a first state in which a three-phase AC power source in which a first phase, a second phase, a third phase, and a neutral line are star-connected is connected to the wireway to be measured and a load is connected to any one of the first phase, the second phase, or the third phase and the neutral line, selects the second measurement unit in a case of a second state in which a three-phase AC power source in which a first phase, a second phase, and a third phase are star-connected is connected to the wireway to be measured and a load is connected to any two of the first phase, the second phase, and the third phase, selects the third measurement unit in a case of a third state in which a three-phase AC power source in which a first phase, a second phase, and a third phase are delta-connected and any one of the phases is grounded is connected to the wireway to be measured and a load is connected to the grounded phase and any one of the non-grounded phases, and selects the fourth measurement unit in a case of a fourth state in which a three-phase AC power source in which a first phase, a second phase, and a third phase are delta-connected and any one of the phases is grounded is connected to the wireway to be measured and a load is connected to the non-grounded two phases.

(3) The first measurement unit calculates, as the first configuration, a leakage current component caused by a ground insulation resistance included in a leakage current flowing in the wireway to be measured based on the leakage current and a voltage applied between any one of the first phase, the second phase, or the third phase to which the load is connected and the neutral line, the second measurement unit calculates, as the second configuration, a leakage current component caused by a ground insulation resistance included in a leakage current flowing in the wireway to be measured based on the leakage current and a voltage applied between the two phases to which the load is connected, the third measurement unit calculates, as the third configuration, a leakage current component caused by a ground insulation resistance included in a leakage current flowing in the wireway to be measured based on the leakage current and a voltage applied between the phases to which the load is connected, and the fourth measurement unit calculates, as the fourth configuration, a leakage current component caused by a ground insulation resistance included in a leakage current flowing in the wireway to be measured based on the leakage current and a voltage applied between the phases to which the load is connected.

(4) A measurement apparatus includes a measurement unit configured to measure a wireway electricity related value which is a value related to electricity of a wireway branched from a wireway to be measured to which a star-connected or delta-connected three-phase AC power source is connected and branched from a three-phase AC to a single-phase AC and distributed, and a selection processor configured to select one state from two or more of a first state in which a three-phase AC power source in which a first phase, a second phase, a third phase, and a neutral line are star-connected is connected to the wireway to be measured and a load is connected to any one of the first phase, the second phase, or the third phase and the neutral line, a second state in which a three-phase AC power source in which a first phase, a second phase, and a third phase are star-connected is connected to the wireway to be measured and a load is connected to any two of the first phase, the second phase, and the third phase, a third state in which a three-phase AC power source in which a first phase, a second phase, and a third phase are delta-connected and any one of the phases is grounded is connected to the wireway to be measured and a load is connected to the grounded phase and any one of the non-grounded phases, and a fourth state in which a three-phase AC power source in which a first phase, a second phase, and a third phase are delta-connected and any one of the phases is grounded is connected to the wireway to be measured and a load is connected to the non-grounded two phases, and the measurement unit calculates, in a case in which the selection processor selects the first state or the third state, a leakage current component caused by a ground insulation resistance included in a leakage current, which is one of the wireway electricity related values, flowing in the wireway to be measured based on the leakage current and a voltage applied between any one of the first phase, the second phase, or the third phase to which the load is connected and the neutral line, in a case in which the selection processor selects the second state, a leakage current component caused by a ground insulation resistance included in a leakage current, which is one of the wireway electricity related values, flowing in the wireway to be measured based on the leakage current and a voltage applied between the two phases to which the load is connected, and in a case in which the selection processor selects the fourth state, a leakage current component caused by a ground insulation resistance included in a leakage current, which is one of the wireway electricity related values, flowing in the wireway to be measured based on the leakage current and a voltage applied between the phases to which the load is connected.

(5) A measurement method includes selecting, in a selection processing step, any one of a plurality of measurement units configured to measure, by different configurations, wireway electricity related values which are values related to electricity of a wireway branched from a wireway to be measured to which a star-connected or delta-connected three-phase AC power source is connected and branched from a three-phase AC to a single-phase AC and distributed, and performing, in a measurement step, measurement by the measurement unit having been selected in the selection processing step, and the measurement unit includes any two or more of, a first measurement unit configured to measure, by a first configuration, a wireway electricity related value which is a value related to electricity of a wireway branched from a wireway to be measured to which a star-connected three-phase AC power source is connected and branched from a three-phase AC to a single-phase AC and distributed, a second measurement unit configured to measure, by a second configuration, a wireway electricity related value which is a value related to electricity of a wireway branched from a wireway to be measured to which a star-connected three-phase AC power source is connected and branched from a three-phase AC to a single-phase AC and distributed, a third measurement unit configured to measure, by a third configuration, a wireway electricity related value which is a value related to electricity of a wireway branched from a wireway to be measured to which a delta-connected three-phase AC power source is connected and branched from a three-phase AC to a single-phase AC and distributed, and a fourth measurement unit configured to measure, by a fourth configuration, a wireway electricity related value which is a value related to electricity of a wireway branched from a wireway to be measured to which a delta-connected three-phase AC power source is connected and branched from a three-phase AC to a single-phase AC and distributed.

(6) A measurement program causes a computer to execute selecting, in a selection processing step, any one of a plurality of measurement units configured to measure, by different configurations, wireway electricity related values which are values related to electricity of a wireway branched from a wireway to be measured to which a star-connected or delta-connected three-phase AC power source is connected and branched from a three-phase AC to a single-phase AC and distributed, and performing, in a measurement step, measurement by the measurement unit having been selected in the selection processing step, and the plurality of measurement units include any two or more of, a first measurement unit configured to measure, by a first configuration, a wireway electricity related value which is a value related to electricity of a wireway branched from a wireway to be measured to which a star-connected three-phase AC power source is connected and branched from a three-phase AC to a single-phase AC and distributed, a second measurement unit configured to measure, by a second configuration, a wireway electricity related value which is a value related to electricity of a wireway branched from a wireway to be measured to which a star-connected three-phase AC power source is connected and branched from a three-phase AC to a single-phase AC and distributed, a third measurement unit configured to measure, by a third configuration, a wireway electricity related value which is a value related to electricity of a wireway branched from a wireway to be measured to which a delta-connected three-phase AC power source is connected and branched from a three-phase AC to a single-phase AC and distributed, and a fourth measurement unit configured to measure, by a fourth configuration, a wireway electricity related value which is a value related to electricity of a wireway branched from a wireway to be measured to which a delta-connected three-phase AC power source is connected and branched from a three-phase AC to a single-phase AC and distributed.

Advantages of the Invention

According to the present disclosure, even in a case where the three-phase power is converted into the single-phase power and the single-phase power is distributed, the wireway electricity related value can be accurately measured.

DESCRIPTION OF EMBODIMENTS

Embodiments of the present disclosure will be described below. The embodiments described below do not unreasonably limit the contents of the present disclosure recited in the appended claims. Not all the configurations described in the embodiments are essential constituent elements of the present disclosure. A method of branching a single-phase circuit from a three-phase AC connection to operate a load is used by private electric utility customers in Japan. Mostly in overseas, the load is operated by this method, and the technique of the present proposal can be applied to the overseas.

Figure 1:
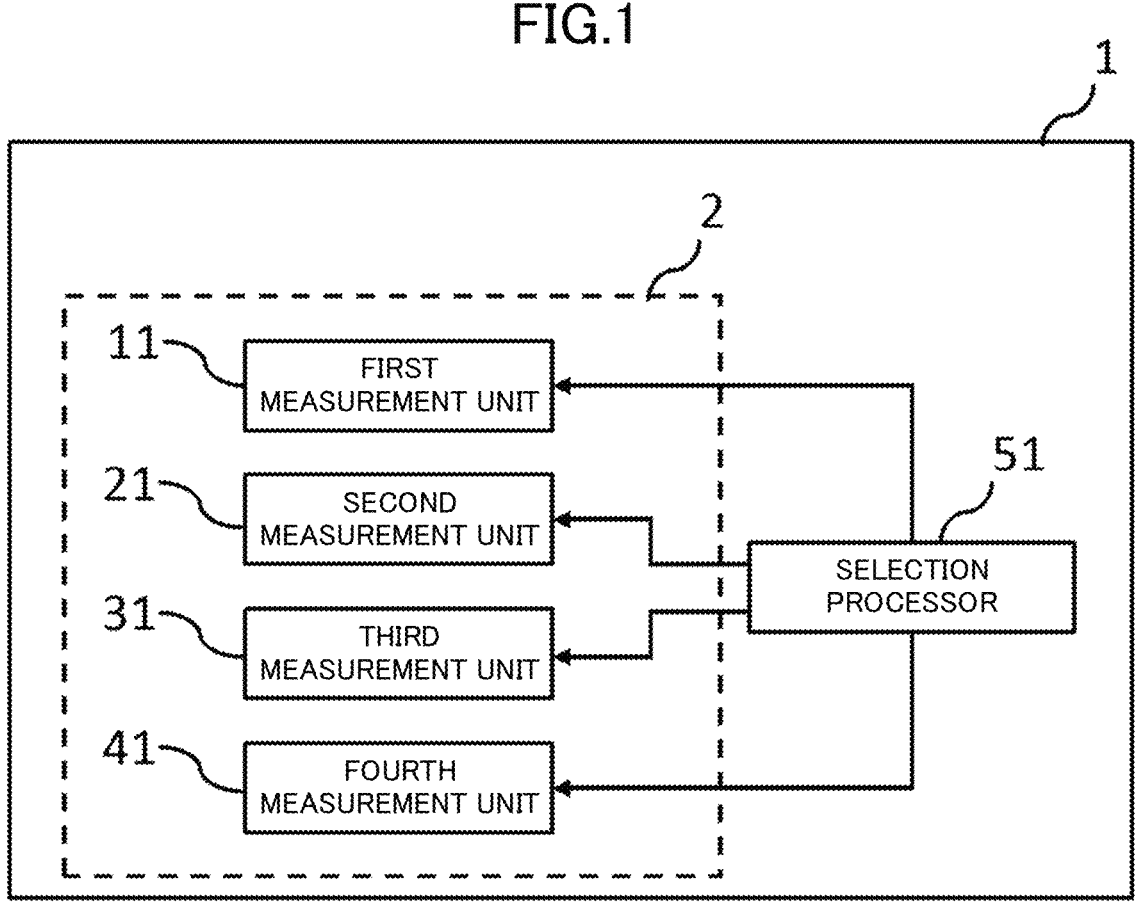
FIG. 1 is a diagram illustrating a first configuration example of a measurement apparatus.
Figure 2:
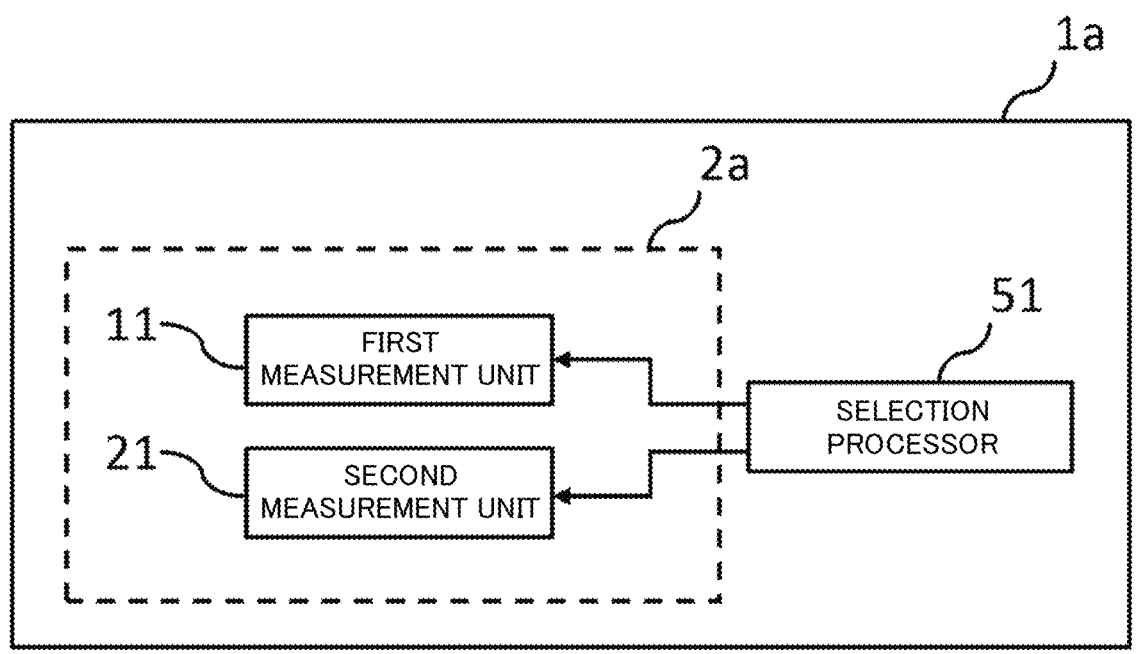
FIG. 2 is a diagram illustrating a second configuration example of the measurement apparatus.
Figure 3:
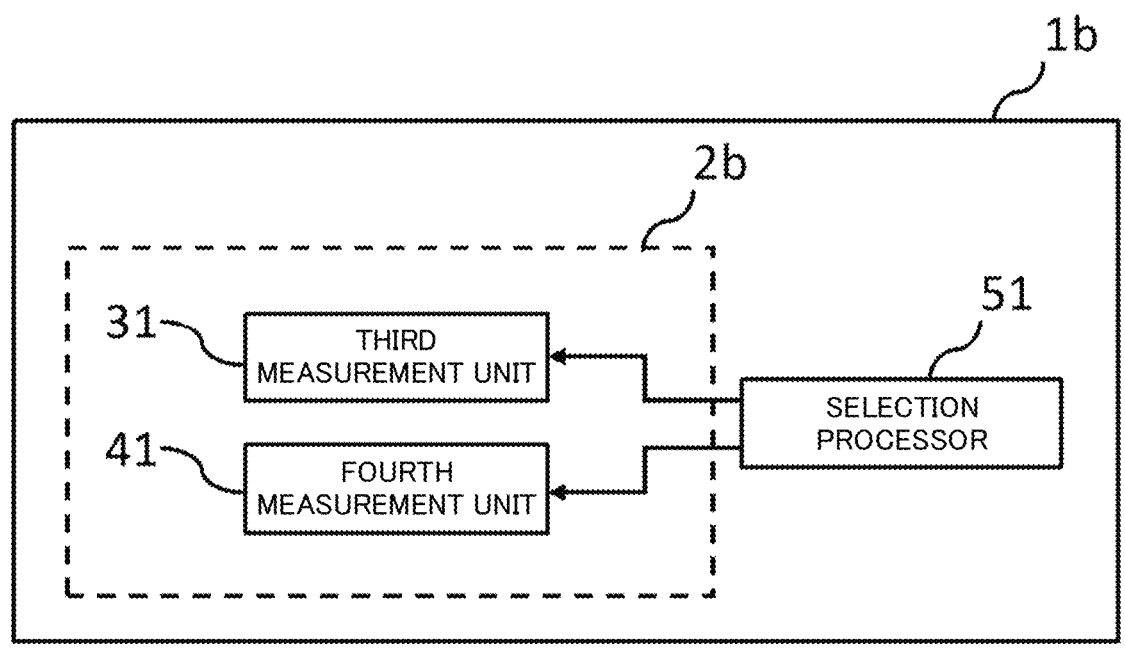
FIG. 3 is a diagram illustrating a third configuration example of the measurement apparatus.

FIG. 1 is a diagram illustrating a first configuration example of a measurement apparatus 1. The measurement apparatus 1 includes a measurement unit 2 and a selection processor 51. The measurement unit 2 includes a first measurement unit 11, a second measurement unit 21, a third measurement unit 31, and a fourth measurement unit 41. In this example, the measurement apparatus 1 will be described with reference to the first configuration example illustrated in FIG. 1, but is not limited to this configuration example. The measurement unit 2 includes any two or more of the first measurement unit 11, the second measurement unit 21, the third measurement unit 31, and the fourth measurement unit 41. For example, a measurement apparatus 1a may include a measurement unit 2a including only a first measurement unit 11 and a second measurement unit 21 (second configuration example), as illustrated in FIG. 2. A measurement apparatus 1b may include a measurement unit 2b including only a third measurement unit 31 and a fourth measurement unit 41 (third configuration example), as illustrated in FIG. 3.

The first measurement unit 11 measures, by the first configuration, a wireway electricity related value which is a value related to electricity of a wireway branched from a wireway to be measured to which a star-connected three-phase AC power source is connected and branched from a three-phase AC to a single-phase AC and distributed. Although details of the configuration (first configuration) of the first measurement unit 11 will be described later, the first measurement unit 11 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between any one of a first phase, a second phase, or a third phase to which a load is connected and a neutral line, $$Ior = Io \times \cos\theta. \quad (1)$$

The second measurement unit 21 measures, by the second configuration, a wireway electricity related value which is a value related to electricity of a wireway branched from a wireway to be measured to which a star-connected three-phase AC power source is connected and branched from a three-phase AC to a single-phase AC and distributed.

Although details of the configuration (second configuration) of the second measurement unit 21 will be described later, the second measurement unit 21 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between two phases to which a load is connected, $$Ior = Io \times \sin\theta / \cos 60°. \quad (2)$$

The third measurement unit 31 measures, by the third configuration, a wireway electricity related value which is a value related to electricity of a wireway branched from a wireway to be measured to which a delta-connected three-phase AC power source is connected and branched from a three-phase AC to a single-phase AC and distributed. Although details of the configuration (third configuration) of the third measurement unit 31 will be described later, the third measurement unit 31 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between phases to which a load is connected, $$Ior = Io \times \cos\theta. \quad (3)$$

The fourth measurement unit 41 measures, by the fourth configuration, a wireway electricity related value which is a value related to electricity of a wireway branched from a wireway to be measured to which a delta-connected three-phase AC power source is connected and branched from a three-phase AC to a single-phase AC and distributed. Although details of the configuration (fourth configuration) of the fourth measurement unit 41 will be described later, the fourth measurement unit 41 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between phases to which a load is connected, $$Ior = Io \times \sin\theta / \cos 30°. \quad (4)$$

The selection processor 51 selects any one of the first measurement unit 11, the second measurement unit 21, the third measurement unit 31, or the fourth measurement unit 41.

Here, the operation of the selection processor 51 will be described. The selection processor 51 selects the first measurement unit 11 in the case of the first state in which the three-phase AC power source in which the first phase, the second phase, the third phase, and the neutral line are star-connected is connected to the wireway to be measured and the load (load used in a single phase) is connected to any one of the first phase, the second phase, or the third phase and the neutral line. Here, the load corresponds to, for example, a lighting circuit and a device connected to a single-phase outlet.

The selection processor 51 selects the second measurement unit 21 in the case of the second state in which the three-phase AC power source in which the first phase, the second phase, and the third phase are star-connected is connected to the wireway to be measured and the load is in the second state in which the load is connected to any two of the first phase, the second phase, and the third phase.

The selection processor 51 selects the third measurement unit 31 when the three-phase AC power source in which the first phase, the second phase, and the third phase are delta-connected and any one of these phases is grounded is connected to the wireway to be measured and the load is in the third state in which the load is connected to the grounded phase and any one of the non-grounded phases.

The selection processor 51 selects the fourth measurement unit 41 when the three-phase AC power source in which the first phase, the second phase, and the third phase are delta-connected and any one of these phases is grounded is connected to the wireway to be measured and the load is in the fourth state in which the load is connected to the non-grounded two phases.

The selection processor 51 may include, for example, a rotary switch. When the switch is operated by an operational personnel, the selection processor 51 selects the measurement unit specified by the switch. The measurement unit selected by the selection processor 51 operates.

Figure 4:
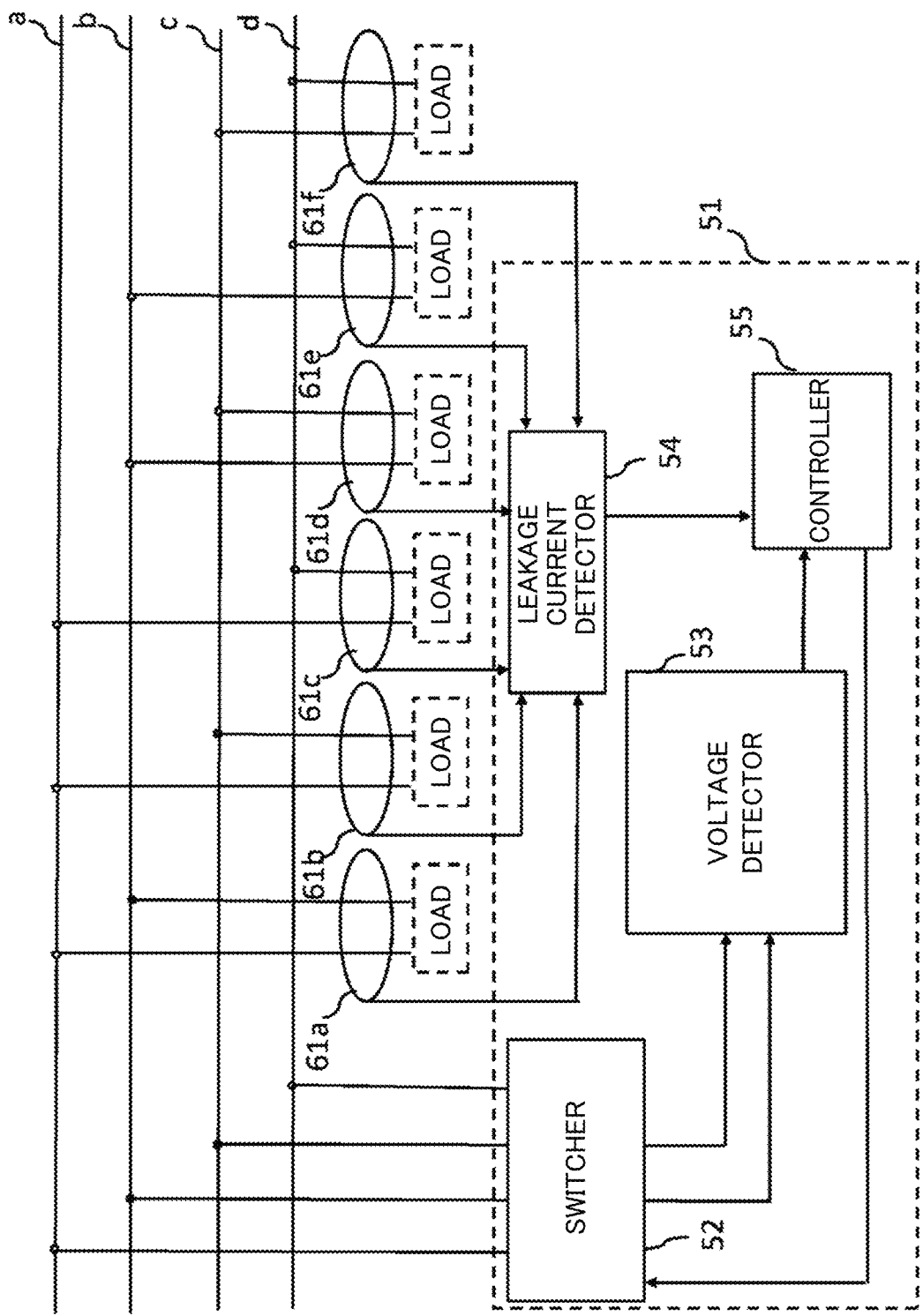
FIG. 4 is a diagram illustrating a configuration in which a selection processor automatically recognizes the state (first to fourth states) of connection of a load.

The selection processor 51 may be configured to automatically recognize the state (first to fourth states) of the connection of the load and select the measurement unit according to a recognition result. The case in which the wireway to be measured on the secondary side includes four wires will be described as an example, but the present disclosure is also applicable to the case in which the wireway to be measured includes three wires. FIG. 4 is a diagram illustrating the configuration in which the selection processor 51 automatically recognizes the state (first to fourth states) of the connection of the load.

The selection processor 51 includes a switcher 52, a voltage detector 53, a leakage current detector 54, and a controller 55. The voltage detector 53 may be implemented using any one of voltage detectors 13, 23, 33, 43 described later. The leakage current detector 54 may be implemented using any one of leakage current detectors 12, 22, 32, 42 described later.

All the four line wires a, b, c, d to be measured in the wireway to be measured are connected to the switcher 52. The switcher 52 connects any two of the connected line wires in the wireway to be measured based on a switching instruction from the controller 55. The switcher 52 and the voltage detector 53 are connected via two line wires. The voltage detector 53 detects a voltage applied to the line wires switched by the switcher 52.

Further, zero-phase current transformers 61a to 61f are connected to line wires (six locations in the example illustrated in FIG. 4) drawn from the wireway to be measured. The zero-phase current transformers 61a to 61f are connected to the leakage current detector 54.

Here, the operation of the controller 55 will be described. In the case in which the controller 55 switches the switcher 52 to select the line wire a and the line wire b, the controller 55 stores a voltage applied between the line wire a and the line wire b and detected by the voltage detector 53 and a leakage current detected from the zero-phase current transformer 61a clamped to wireways drawn from the line wire a and the line wire b in association with each other. In the case in which the controller 55 switches the switcher 52 to select the line wire a and the line wire c, the controller 55 stores a voltage applied between the line wire a and the line wire c and detected by the voltage detector 53 and a leakage current detected from the zero-phase current transformer 61b clamped to wireways drawn from the line wire a and the line wire c in association with each other. In the case in which the controller 55 switches the switcher 52 to select the line wire a and the line wire d, the controller 55 stores a voltage applied between the line wire a and the line wire d and detected by the voltage detector 53 and a leakage current detected from the zero-phase current transformer 61c clamped to wireways drawn from the line wire a and the line wire d in association with each other. In the case in which the controller 55 switches the switcher 52 to select the line wire b and the line wire c, the controller 55 stores a voltage applied between the line wire b and the line wire c and detected by the voltage detector 53 and a leakage current detected from the zero-phase current transformer 61d clamped to wireways drawn from the line wire b and the line wire c in association with each other. In the case in which the controller 55 switches the switcher 52 to select the line wire b and the line wire d, the controller 55 stores a voltage applied between the line wire b and the line wire d and detected by the voltage detector 53 and a leakage current detected from the zero-phase current transformer 61e clamped to wireways drawn from the line wire b and the line wire d in association with each other. In the case in which the controller 55 switches the switcher 52 to select the line wire c and the line wire d, the controller 55 stores a voltage applied between the line wire c and the line wire d and detected by the voltage detector 53 and a leakage current detected from the zero-phase current transformer 61f clamped to wireways drawn from the line wire c and the line wire d in association with each other.

The controller 55 determines, from the stored voltage, whether the star connection (the first state or the second state) or the delta connection (the third state or the fourth state) is made. For example, the controller 55 determines that the star connection is made when a voltage between the R-phase and the neutral line N (or the earth (E)), a voltage between the S-phase and the neutral line N (or the earth (E)), and a voltage between the T-phase and the neutral line N (or the earth (E)) are substantially the same as each other. The controller 55 determines that the delta connection is made when there is a difference between the voltage between the R-phase and the earth (E) and the voltage between the S-phase and the earth (E) or when there is a difference between the voltage between the T-phase and the earth (E) and the voltage between the S-phase and the earth (E).

In the case in which the controller 55 determines that the star connection is made, when the load is connected to any of the phases and the neutral line N, the controller 55 recognizes such a state as the first state, and when the load is not connected to any of the phases and the neutral line N, the controller 55 recognizes such a state as the second state. Here, the measurement apparatus 1 may include a first switch configured to indicate whether or not the load is connected to any of the phases and the neutral line N. A user checks a connection state, and turns ON or OFF the first switch. The controller 55 determines that the load is connected to any of the phases and the neutral line N when the first switch is ON, and determines that the load is not connected to any of the phases and the neutral line N when the first switch is OFF. In the case in which the controller 55 determines that the delta connection is made, when the phases including the S-phase are clamped by the zero-phase current transformer, the controller 55 recognizes such a state as the third state, and when the phases including the S-phase are not clamped by the zero-phase current transformer, the controller 55 recognizes such a state as the fourth state. Here, the measurement apparatus 1 may include a second switch configured to indicate whether or not the phases including the S-phase are clamped by the zero-phase current transformer. The user checks the state of clamping by the zero-phase current transformer, and turns ON or OFF the second switch. The controller 55 determines that the phases including the S-phase are clamped by the zero-phase current transformer when the second switch is ON, and determines that the phases including the S-phase are not clamped by the zero-phase current transformer when the second switch is OFF.

The direction of the leakage current is an angle when the leakage current is represented by a vector. Here, in the case of the single-phase AC, the phase of a leakage current component (Ioc) caused by a ground capacitance and the phase of a leakage current component (Ior) caused by a ground insulation resistance directly related to an insulation resistance are different from each other by 90 degrees. The leakage current (Io) detected by the zero-phase current transformer is a combination of Ioc and Ior, and therefore appears somewhere in the range of 90 degrees.

Figure 9:
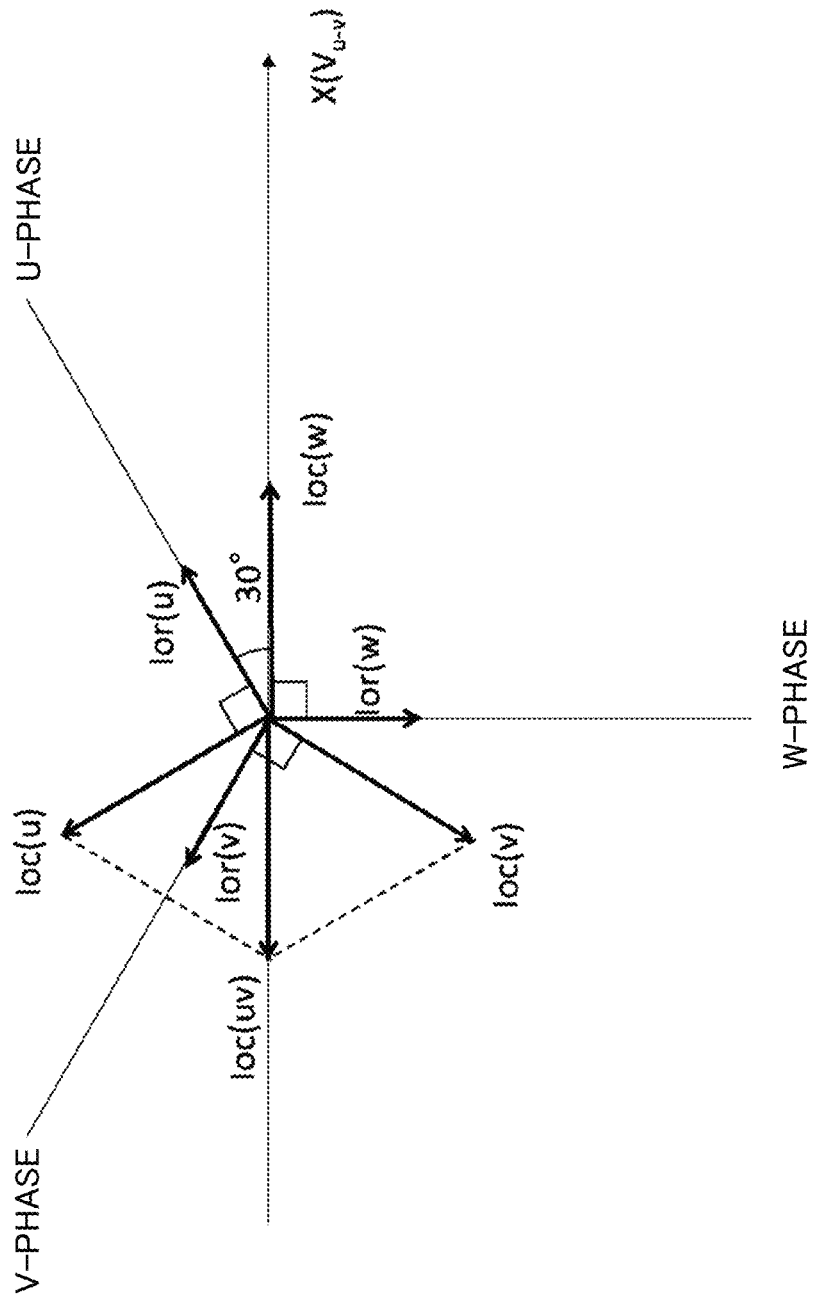
FIG. 9 is a diagram schematically illustrating vector representations of Ior and Ioc of each phase in star connection.

As will be described later with reference to FIG. 9, for example, in the case of the star connection, when the Ior of the U-phase is caused at a position of 30 degrees, the Ior of the V-phase is caused at a position of 150 degrees, and the Ior of the W-phase is caused at a position of 270 degrees. Since the Ioc of the U-phase is caused at a position of 120 degrees, the Io of the U-phase is caused in a range of 30 degrees to 120 degrees. Similarly, since the Ioc of the V-phase is caused at a position of 240 degrees, the Io of the U-phase is caused in a range of 150 degrees to 240 degrees, and since the Ioc of the W-phase is caused at a position of 360 (0) degrees, the Io of the U-phase is caused in a range of 270 degrees to 360 (0) degrees. The controller 55 can recognize, from the direction of the leakage current Io detected by the zero-phase current transformer, which line wires are clamped together.

The selection processor 51 may be configured to connect only any two line wires (for example, the line wire a and the line wire b) of the wireways forming the wireway to be measured to the voltage detector 53. In the case of such a configuration, the selection processor 51 does not include the switcher 52, and performs arithmetic operation of shifting the phase of the leakage current detected by the zero-phase current transformer clamping the line wires other than the two connected line wires (for example, by) 120° to recognize the state (first to fourth states) of the connection of the load.

For example, the measurement apparatus 1 includes a first selector configured to select whether the power source side is in the star connection or the delta connection, a second selector configured to select which two line wires (phases) are connected to the voltage detector 53, and a third selector configured to select which two phases are clamped by the zero-phase current transformer. The selection processor 51 recognizes the state of the connection of the load based on the states selected by the first selector, the second selector, and the third selector, and calculates the Ior.

Specifically, in the case in which the first selector selects the star connection, the second selector selects that the R-phase and the T-phase are connected to the voltage detector 53, and the third selector selects that the R-phase and the T-phase are clamped by the zero-phase current transformer, the state of the connection of the load is recognized as the second state, and the Ior is calculated according to the following equation:

$$Ior = Io \times \sin\theta/\cos 60°.$$

In the case in which the first selector selects the star connection, the second selector selects that the R-phase and the T-phase are connected to the voltage detector 53, and the third selector selects that the S-phase and the T-phase are clamped by the zero-phase current transformer, the state of the connection of the load is recognized as the second state. However, since the phases connected to the voltage detector 53 are different from the phases clamped by the zero-phase current transformer, the phase of the leakage current detected by the zero-phase current transformer is shifted by 120°, and the Ior is calculated according to the following equation:

$$Ior = Io \times \sin(\theta - 120°)/\cos 60°.$$

In the case in which the first selector selects the delta connection, the second selector selects that the R-phase and the T-phase are connected to the voltage detector 53, and the third selector selects that the S-phase and the T-phase are clamped by the zero-phase current transformer, the state of the connection of the load is recognized as the third state. However, since the phases connected to the voltage detector 53 are different from the phases clamped by the zero-phase current transformer, the phase of the leakage current detected by the zero-phase current transformer is shifted by 120°, and the Ior is calculated according to the following equation:

$$Ior = Io \times \cos(\theta - 120°).$$

The first selector may further have a configuration for selecting whether or not the power source side is the single phase.

As described above, the selection processor 51 measures all the voltages between the phases and the voltages between the phases and the ground, recognizes the wireways from these voltages, automatically recognizes the state (first to fourth states) of the connection of the load from the phases clamped by the zero-phase current transformer (ZCT), and selects the measurement unit according to the recognition result.

In this manner, in the case where the three-phase AC output from the three-phase AC power source is converted into the single-phase AC and the load is connected to the wireway in which the single-phase AC flows, the measurement apparatus 1 can select the measurement unit (the above-described first measurement unit 11 to fourth measurement unit 41) suitable for the state (the above-described first to fourth states) of the three-phase AC power source and accurately calculate the wireway electricity related value (particularly, the leakage current component (Ior) caused by the ground insulation resistance included in the leakage current) of the wireway.

<Configuration and Operation of First Measurement Unit 11>

Here, specific configuration and operation of the first measurement unit 11 will be described. The first measurement unit 11 operates in the case of the first state in which the three-phase AC power source in which the first phase, the second phase, the third phase, and the neutral line are star-connected is connected to the wireway to be measured and the load is connected to any one of the first phase, the second phase, or the third phase and the neutral line.

Figure 5:
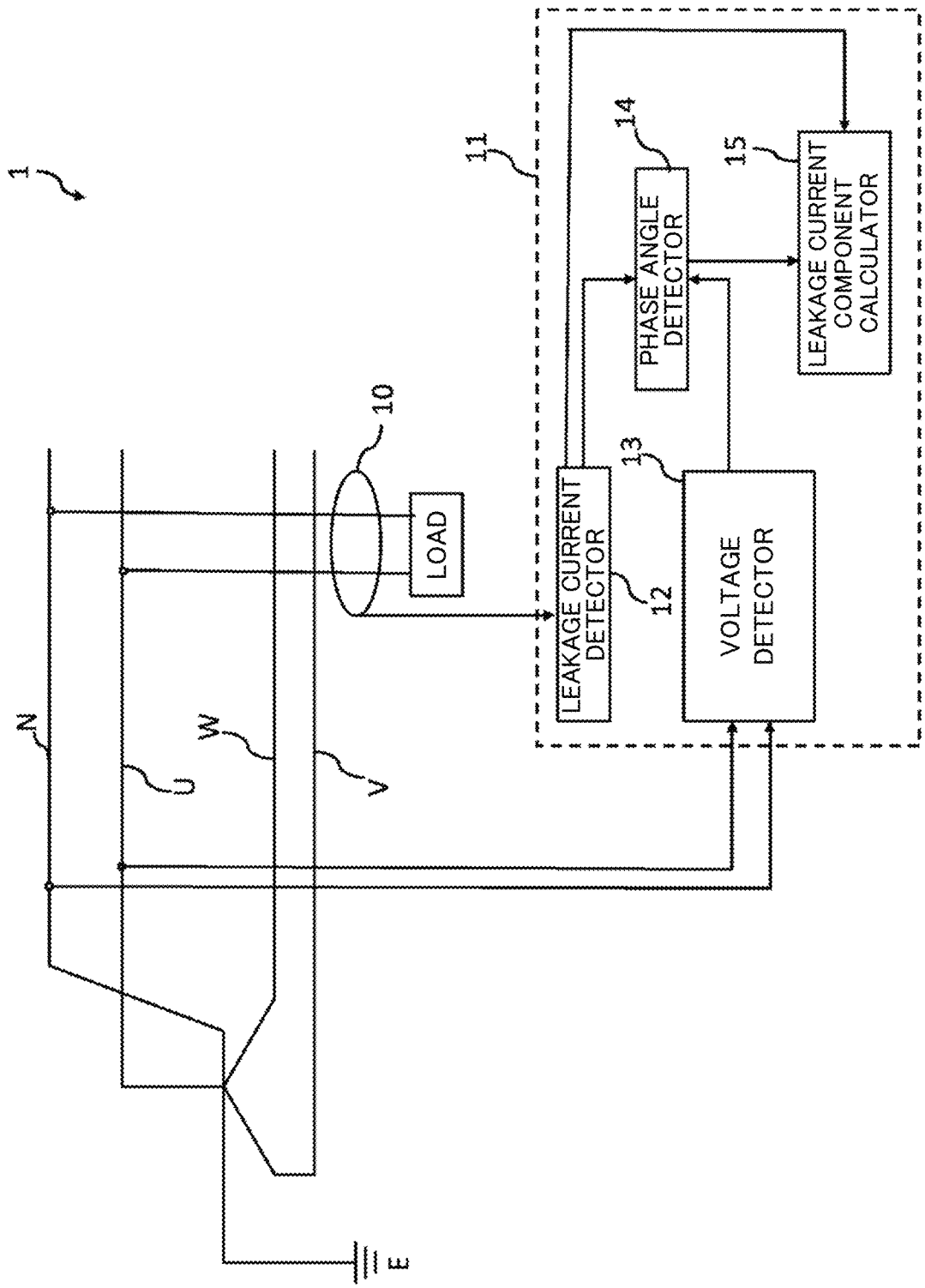
FIG. 5 is a block diagram illustrating the configuration of a first measurement unit.

FIG. 5 is a block diagram illustrating the configuration of the first measurement unit 11. Specifically, FIG. 5 is a block diagram illustrating the configuration of the first measurement unit 11 and a diagram illustrating a connection state between the first measurement unit 11 and the wireway to be measured in the state in which the controller 55 recognizes the first state and the selection processor 51 selects the first measurement unit 11. The first measurement unit 11 includes the leakage current detector 12, the voltage detector 13, a phase angle calculator 14, and an ground insulation resistance leakage current component calculator (hereinafter referred to as a leakage current component calculator) 15.

The leakage current detector 12 detects a leakage current flowing in the wireway to be measured to which the load is connected. The leakage current detector 12 detects a leakage current flowing in a single-phase circuit branched from the star connection (Y-connection) of the first phase, the second phase, and the third phase. While the first, second, and third phases will be hereinafter referred to as "U-phase," "V-phase," and "W-phase," respectively, the names are not limited thereto. While the leakage current measured by the leakage current detector 12 will be hereinafter referred to as "Io," the name is not limited thereto.

A zero-phase current transformer (ZCT) 10 is connected to the leakage current detector 12. The zero-phase current transformer 10 is configured to clamp the wireways collectively. For example, the zero-phase current transformer 10 may be configured as a handy-type split-core zero-phase current transformer, which makes it possible for an operator to easily place the current transformer to the wireways on site. The leakage current detector 12 detects (calculates) a leakage current (Io) flowing in the wireway to be measured, from a signal measured by the zero-phase current transformer 10.

The voltage detector 13 detects a voltage applied between the neutral line and any one of the first phase, the second phase, or the third phase to which the load is connected. FIG. 5 illustrates an example in which the load is disposed between the U-phase and the neutral line N. The voltage detector 13 detects a voltage applied between the U-phase and the neutral line N. The load may be disposed between the V-phase and the neutral line N or between the W-phase and the neutral line N. In the case in which the load is disposed between the V-phase and the neutral line N, the voltage detector 13 detects a voltage applied between the V-phase and the neutral line N. In the case in which the load is disposed between the W-phase and the neutral line N, the voltage detector 13 detects a voltage applied between the W-phase and the neutral line N.

The phase angle calculator 14 calculates a phase angle based on the leakage current detected by the leakage current detector 12 and the voltage detected by the voltage detector 13. Specifically, the phase angle calculator 14 detects the phase angle (θ) through arithmetic processing of the waveform of the leakage current (Io) detected by the leakage current detector 12 and the waveform of the voltage (e.g., reference voltage $V_{N-U}$) detected by the voltage detector 13. For example, the phase angle calculator 14 detects the phase angle (θ) between the reference voltage $V_{N-U}$ and the leakage current (Io) based on the zero-crossing point of the reference voltage $V_{N-U}$ and the zero-crossing point of the leakage current (Io). The arithmetic processing for calculating the phase angle may be performed by synchronous detection or discrete Fourier transform (DFT). The configuration in the case of using the synchronous detection will be described later.

The leakage current component calculator 15 calculates, according to the equation (1) above, a leakage current component (Ior) caused by a ground insulation resistance included in the leakage current from the leakage current (Io) detected by the leakage current detector 12 and the phase angle θ calculated by the phase angle calculator 14. Hereinafter, the leakage current component caused by the ground insulation resistance may be referred to as "Ior."

The above-described leakage current, voltage, phase angle, and leakage current component caused by the ground insulation resistance are included in the wireway electricity related value.

In this manner, the measurement apparatus 1 including the first measurement unit 11 can accurately calculate the Ior caused in the single-phase circuit branched from the star connection based on the leakage current (Io) detected by the leakage current detector 12 and the phase angle (phase difference) calculated by the phase angle calculator 14. That is, the first measurement unit 11 is a measurement unit used in the case in which the load is disposed between the neutral line N and the U-phase, between the neutral line N and the V-phase, or between the neutral line N and the W-phase in the star connection and is operated as the single-phase circuit.

Here, a potential difference between E (earth) and the neutral line N (between the N-phase and the ground) is basically 0 [V], and a predetermined voltage (for example, 100 [V]) is applied between the E and the U-phase, between the E and the V-phase, or between the E and the W-phase (between each phase and the ground). The load is disposed between the neutral line N and the U-phase, between the neutral line N and the V-phase, or between the neutral line N and the W-phase to which the single-phase circuit is connected. The first measurement unit 11 detects a voltage V between the phases between which the load is disposed, obtains a phase difference (θ) between the waveform (sine wave) of the voltage V and the waveform of a leakage current (Io) input from the zero-phase current transformer (ZCT) 10, and calculates the Ior by substituting the leakage current (Io) and the phase difference (θ) into the equation (1).

The measurement apparatus 1 can measure and calculate, as wireway electricity related values, various numerical values including the above-described leakage current (Io) and Ior, such as a current value, a power value, and the temporal histories and temporal variations thereof. The measurement apparatus 1 can also inspect or monitor the wireway to be measured using the wireway electricity related value.

Figure 6:
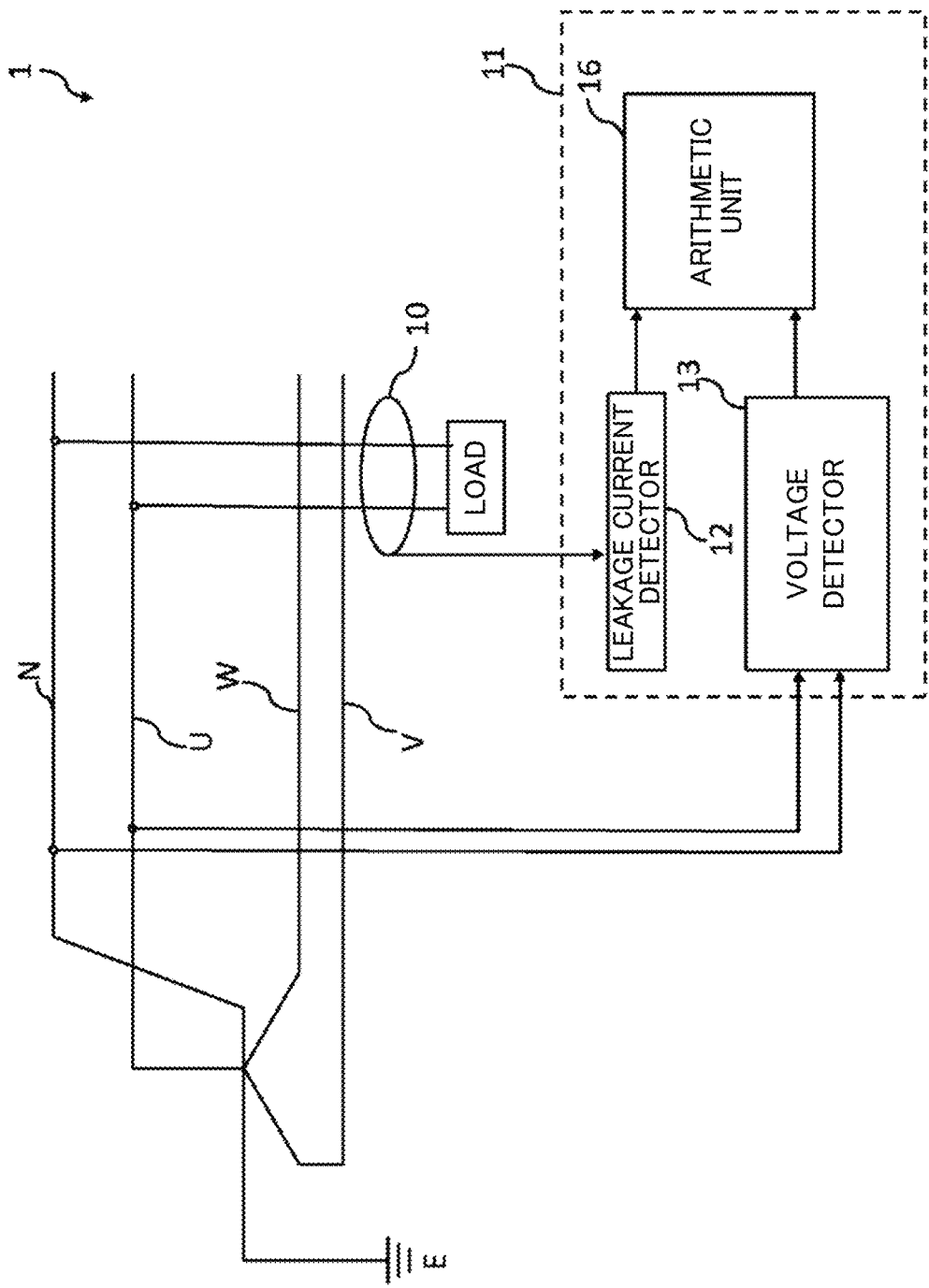
FIG. 6 is a block diagram illustrating a variation of the first measurement unit.

The configuration of the first measurement unit 11 is one example, and is not limited to the above-described configuration. As illustrated in FIG. 6, the first measurement unit 11 may include an arithmetic unit 16 instead of the phase angle detector 14 and the leakage current component calculator 15.

The arithmetic unit 16 calculates a leakage current component Ior(Io×cosθ) caused by a ground insulation resistance by integration by synchronous detection based on (the waveform of) the leakage current detected by the leakage current detector 12 and (the waveform of) the voltage detected by the voltage detector 13. The integration by the synchronous detection is to calculate Io×cosθ by integrating the waveform in a predetermined range such as 0 to 180 degrees, and one specific example will be described below. The integration by the synchronous detection is not limited to the following calculation.

The arithmetic unit 16 performs predetermined processing on the voltage value (voltage waveform) detected by the voltage detector 13 and the leakage current (current waveform) detected by the leakage current detector 12, outputs a parameter signal of a logical signal, performs full-wave rectification on the leakage current (current waveform) detected by the leakage current detector 12, performs quantized transform on the full-wave rectified current waveform by a continuous ΔΣ ADC, and measures parameters of logical signals of sin and cos parts generated by the quantized transform and the average of the current waveform obtained by the continuous ΔΣ ADC. Specifically, the arithmetic unit 16 performs logical processing on the voltage value (voltage waveform) detected by the voltage detector 13 to generate a first logical signal, performs logical processing on the leakage current (current waveform) detected by the leakage current detector 12 to generate a second logical signal, performs arithmetic processing on the first logical signal and the second logical signal, and outputs a positive/negative or Hi/Lo signal (first signal). Moreover, the arithmetic unit 16 generates zero-crossing points when the first logical signal changes, stores a time between the generated zero-crossing points, inverts the first logical signal during a period in which a time from a next zero-crossing point is the half of the stored time or less, performs phase conversion on the first logical signal, performs arithmetic processing on the phase-converted voltage waveform and the second logical signal, and outputs a positive/negative or Hi/Lo signal (second signal). The arithmetic unit 16 can obtain the average of a desired type of current value by performing counting by the quantized transform by the continuous ΔΣ ADC based on the first signal and the second signal. The desired type of current value includes an AC value measurement, and an input current I [A], an active current Ir=Icosθ [A], and a reactive current IL−IC=Isinθ [A] can be obtained. Here, the above-described "active current Ir=Icosθ" is the leakage current component Ior caused by the ground insulation resistance.

According to such a configuration, there is an advantage that the leakage current component Ior caused by the ground insulation resistance can be calculated without calculation of the vector of the phase difference.

<Configuration and Operation of Second Measurement Unit 21>

Next, specific configuration and operation of the second measurement unit 21 will be described. The second measurement unit 21 operates in the case of the second state in which the three-phase AC power source in which the first phase, the second phase, and the third phase are star-connected is connected to the wireway to be measured and the load is connected to any two of the first phase, the second phase, and the third phase.

Figure 7:
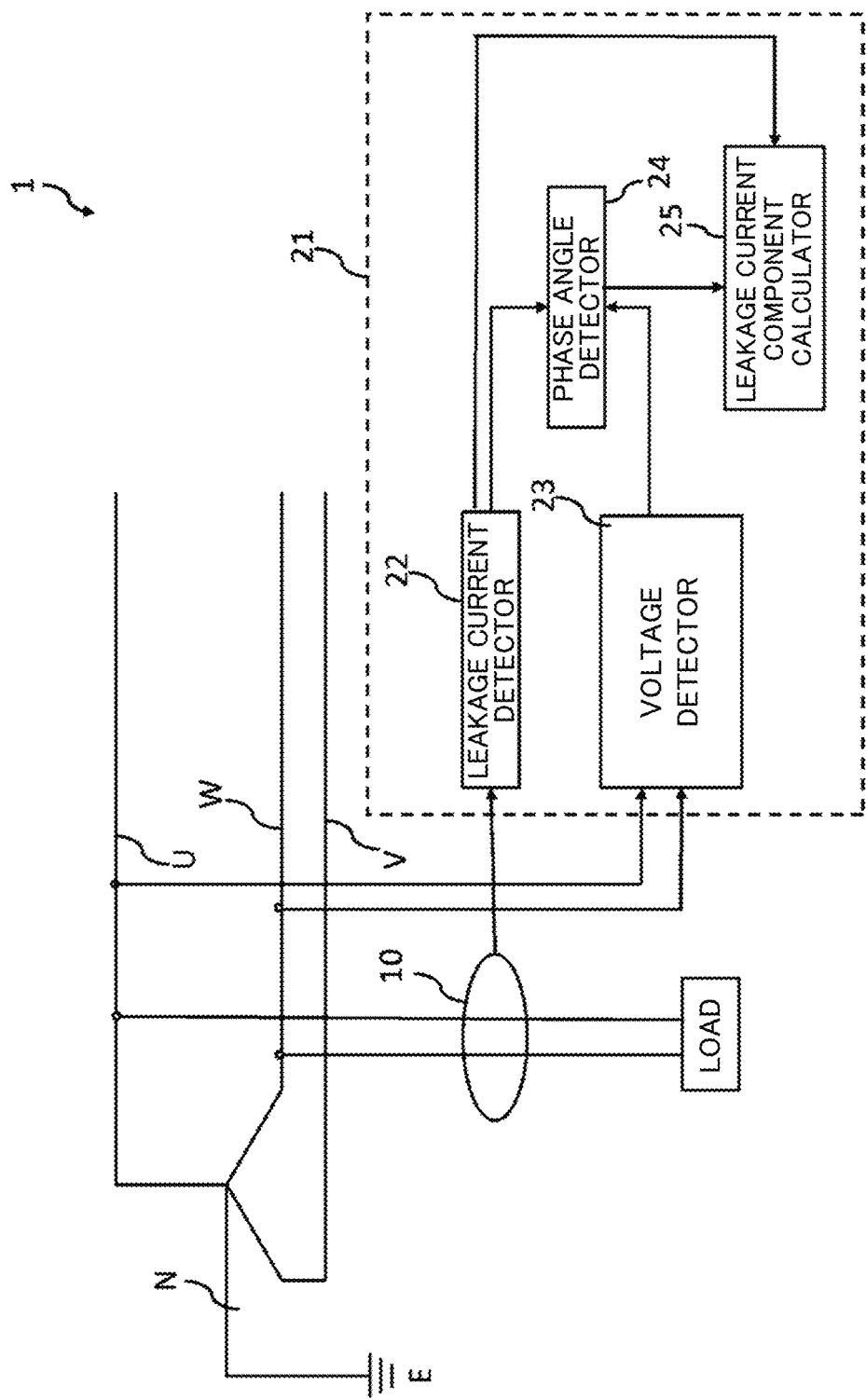
FIG. 7 is a block diagram illustrating the configuration of a second measurement unit.

FIG. 7 is a block diagram illustrating the configuration of the second measurement unit 21. Specifically, FIG. 7 is a block diagram illustrating the configuration of the second measurement unit 21 and a diagram illustrating a connection state between the second measurement unit 21 and the wireway to be measured in a state in which the controller 55 recognizes the second state and the selection processor 51 selects the second measurement unit 21. The second measurement unit 21 includes the leakage current detector 22, the voltage detector 23, a phase angle calculator 24, and an ground insulation resistance leakage current component calculator (hereinafter referred to as a leakage current component calculator) 25.

The leakage current detector 22 detects a leakage current flowing in the wireway to be measured to which the load is connected. The leakage current detector 22 detects a leakage current flowing in a single-phase circuit branched from the star connection (Y-connection) of the first phase, the second phase, and the third phase. While the first, second, and third phases will be hereinafter referred to as "U-phase," "V-phase," and "W-phase," respectively, the names are not limited thereto. While the leakage current measured by the leakage current detector 22 will be hereinafter referred to as "Io," the name is not limited thereto.

A zero-phase current transformer (ZCT) 10 is connected to the leakage current detector 22. The zero-phase current transformer 10 is configured to clamp the wireways collectively. For example, the zero-phase current transformer 10 may be configured as a handy-type split-core zero-phase current transformer, which makes it possible for an operator to easily place the current transformer to the wireways on site. The leakage current detector 22 detects (calculates) an Io flowing in the wireway to be measured, from a signal measured by the zero-phase current transformer 10.

The voltage detector 23 detects a voltage applied between two phases to which the load is connected. FIG. 7 illustrates an example in which the load is disposed between the U-phase and the W-phase. The voltage detector 23 detects a voltage applied between the U-phase and the W-phase. The load may be disposed between the V-phase and the U-phase or between the V-phase and the W-phase. In the case in which the load is disposed between the V-phase and the U-phase, the voltage detector 23 detects a voltage applied between the V-phase and the U-phase. In the case in which the load is disposed between the V-phase and the W-phase, the voltage detector 23 detects a voltage applied between the V-phase and the W-phase.

The phase angle calculator 24 calculates a phase angle based on the leakage current detected by the leakage current detector 22 and the voltage detected by the voltage detector 23. Specifically, the phase angle calculator 24 detects the phase angle (θ) through arithmetic processing of the waveform of the leakage current (Io) detected by the leakage current detector 22 and the waveform of the voltage (e.g., reference voltage $V_{U-W}$) detected by the voltage detector 23. For example, the phase angle calculator 24 detects the phase angle (θ) between the reference voltage $V_{U-W}$ and the leakage current (Io) based on the zero-crossing point of the reference voltage $V_{U-W}$ and the zero-crossing point of the leakage current (Io). The arithmetic processing for calculating the phase angle may be performed by synchronous detection or discrete Fourier transform (DFT). The configuration in the case of using the synchronous detection will be described later.

The leakage current component calculator 25 calculates, according to the equation (2) above, a leakage current component Ior caused by a ground insulation resistance included in the leakage current from the leakage current (Io) detected by the leakage current detector 22 and the phase angle θ calculated by the phase angle calculator 24.

The above-described leakage current, voltage, phase angle, and leakage current component caused by the ground insulation resistance are included in the wireway electricity related value.

In this manner, the measurement apparatus 1 including the second measurement unit 21 can accurately calculate the Ior caused in the single-phase circuit branched from the star connection based on the leakage current (Io) detected by the leakage current detector 22 and the phase angle (phase difference) calculated by the phase angle calculator 24. That is, the second measurement unit 21 is a measurement unit used in a case where the load is disposed between the U-phase and the V-phase, between the V-phase and the W-phase, or between the U-phase and the W-phase in the star connection and is operated as the single-phase circuit.

For example, in a case where the load is connected as the single-phase circuit between the U-phase and the V-phase, the voltage between the E (earth) and the U-phase and the voltage between the E and the V-phase are the same as each other (for example, 100 [V]), and the voltage between the U-phase and the V-phase is different (for example, 200 [V]). The load is disposed between the U-phase and the V-phase, between the V-phase and the W-phase, or between the U-phase and the W-phase. The second measurement unit 21 detects a voltage V between the phases between which the load is disposed, obtains a phase difference (θ) between the waveform (sine wave) of the voltage V and the waveform of a leakage current (Io) input from the zero-phase current transformer (ZCT) 10, and calculates the Ior by substituting the leakage current (Io) and the phase difference (θ) into the equation (2).

Here, the U-phase and the V-phase have the same potential difference with respect to the ground in a normal state. In this case, even if floating capacitances are caused in the U-phase and the V-phase, the same amount of floating capacitance is caused in both phases, and the floating capacitances are not unbalanced.

Here, a reason why the unbalance does not occur will be described below. The leakage current (Io) includes a leakage current component (hereinafter referred to as "Ioc") caused by a ground capacitance and a leakage current component (hereinafter referred to as "Ior") caused by a ground insulation resistance directly related to an insulation resistance.

Vector representations of the Ioc and the Ior will be described with reference to FIG. 9. FIG. 9 is a diagram schematically illustrating the vector representations of the Ior and the Ioc of each phase.

Relative to a reference voltage of 0 degrees, in a case where a resistance component leakage current (hereinafter may be referred to as "Ior(u)") flowing in the U-phase is caused at a position of 30 degrees in the vector representation, a resistance component leakage current (hereinafter may be referred to as "Ior(v)") flowing in the V-phase is caused at a position of 150 degrees, and a resistance component leakage current (hereinafter may be referred to as "Ior(w)") flowing in the W-phase is caused at a position of 270 degrees. Hereinafter, the vector Ior(u) will be simply referred to as "Ior(u)," the vector Ior(v) will be simply referred to as "Ior(v)," and the vector Ior(w) will be simply referred to as "Ior(w)." In this embodiment, the potential between the U-phase and the V-phase is regarded as the reference voltage, which is set to 0 degrees.

A capacitive component leakage current (hereinafter referred to as "Ioc(u)") flowing in the U-phase is caused at a position of 120 degrees which is advanced from the Ior(u) by 90 degrees (π/2). A capacitive component leakage current (hereinafter referred to as "Ioc(v)") flowing in the V-phase is caused at a position of 240 degrees which is advanced from the Ior(v) by 90 degrees (π/2). A capacitive component leakage current (hereinafter may be referred to as "Ioc(s)") flowing in the W-phase is caused at a position of 0 degrees (360 degrees) which is advanced from the Ior(w) by 90 degrees (π/2).

Hereinafter, the vector Ioc(u) will be simply referred to as "Ioc(u)," the vector Ioc(v) will be simply referred to as "Ioc(v)," and the vector Ioc(s) will be simply referred to as "Ioc(s)."

A vector (Ioc(uv)) obtained by combining the Ioc(u) and the Ioc(v) is caused at a position of 180 degrees. That is, the Ioc(u) caused in the U-phase and the Ioc(v) caused in the V-phase are not unbalanced.

In a case where the Ioc(u), the Ioc(v), and the Ioc(w) are balanced, the Ioc(uv) and the Ioc(w) are combined and cancel each other, and the Ioc is not caused.

The measurement apparatus 1 can measure and calculate, as wireway electricity related values, various numerical values including the above-described leakage current (Io) and Ior, such as a current value, a power value, and the temporal histories and temporal variations thereof. The measurement apparatus 1 can also inspect or monitor the wireway to be measured using the wireway electricity related value.

Figure 8:
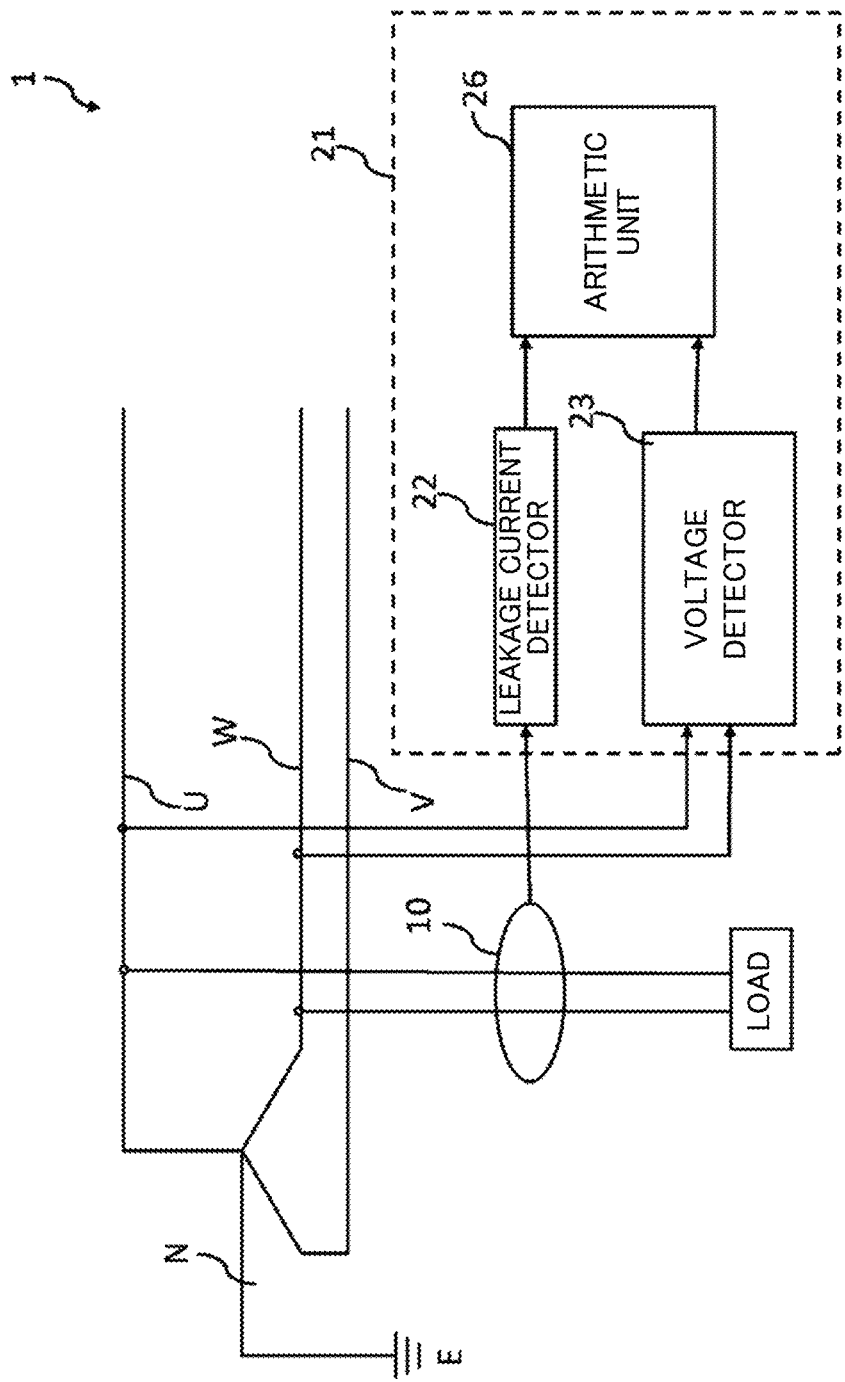
FIG. 8 is a block diagram illustrating a variation of the second measurement unit.

The configuration of the second measurement unit 21 is one example, and is not limited to the above-described configuration. As illustrated in FIG. 8, the second measurement unit 21 may include an arithmetic unit 26 instead of the phase angle detector 24 and the leakage current component calculator 25.

The arithmetic unit 26 calculates a leakage current component Ior(Io×sinθ/cos60°) caused by a ground insulation resistance by integration by synchronous detection based on (the waveform of) the leakage current detected by the leakage current detector 22 and (the waveform of) the voltage detected by the voltage detector 23. The integration by the synchronous detection is to calculate Io×sinθ by integrating the waveform in a predetermined range such as 90 to 270 degrees and divide Io×sinθ by cos60°, and one specific example will be described below. The integration by the synchronous detection is not limited to the following calculation.

The arithmetic unit 26 performs predetermined processing on the voltage value (voltage waveform) detected by the voltage detector 23 and the leakage current (current waveform) detected by the leakage current detector 22, outputs a parameter signal of a logical signal, performs full-wave rectification on the leakage current (current waveform) detected by the leakage current detector 22, performs quantized transform on the full-wave rectified current waveform by a continuous ΔΣ ADC, and measures parameters of logical signals of sin and cos parts generated by the quantized transform and the average of the current waveform obtained by the continuous ΔΣ ADC. Specifically, the arithmetic unit 26 performs logical processing on the voltage value (voltage waveform) detected by the voltage detector 23 to generate a first logical signal, performs logical processing on the leakage current (current waveform) detected by the leakage current detector 22 to generate a second logical signal, performs arithmetic processing on the first logical signal and the second logical signal, and outputs a positive/negative or Hi/Lo signal (first signal). Moreover, the arithmetic unit 26 generates zero-crossing points when the first logical signal changes, stores a time between the generated zero-crossing points, inverts the first logical signal during a period in which a time from a next zero-crossing point is the half of the stored time or less, performs phase conversion on the first logical signal, performs arithmetic processing on the phase-converted voltage waveform and the second logical signal, and outputs a positive/negative or Hi/Lo signal (second signal). The arithmetic unit 26 can obtain the average of a desired type of current value by performing counting by the quantized transform by the continuous ΔΣ ADC based on the first signal and the second signal. The desired type of current value includes an AC value measurement, and an input current I [A], an active current Ir=Icosθ [A], and a reactive current IL−IC=Isinθ [A] can be obtained. The arithmetic unit 26 divides the "reactive current IL−IC=Isinθ" by cos60° to calculate the leakage current component Ior caused by the ground insulation resistance.

According to such a configuration, there is an advantage that the leakage current component Ior caused by the ground insulation resistance can be calculated without calculation of the phase angle.

<Configuration and Operation of Third Measurement Unit 31>

Next, specific configuration and operation of the third measurement unit 31 will be described. The third measurement unit 31 operates in the case of the third state in which the three-phase AC power source in which the first phase, the second phase, and the third phase are delta-connected and any one of these phases is grounded is connected to the wireway to be measured and the load is connected to the grounded phase and any one of the non-grounded phases.

Figure 10:
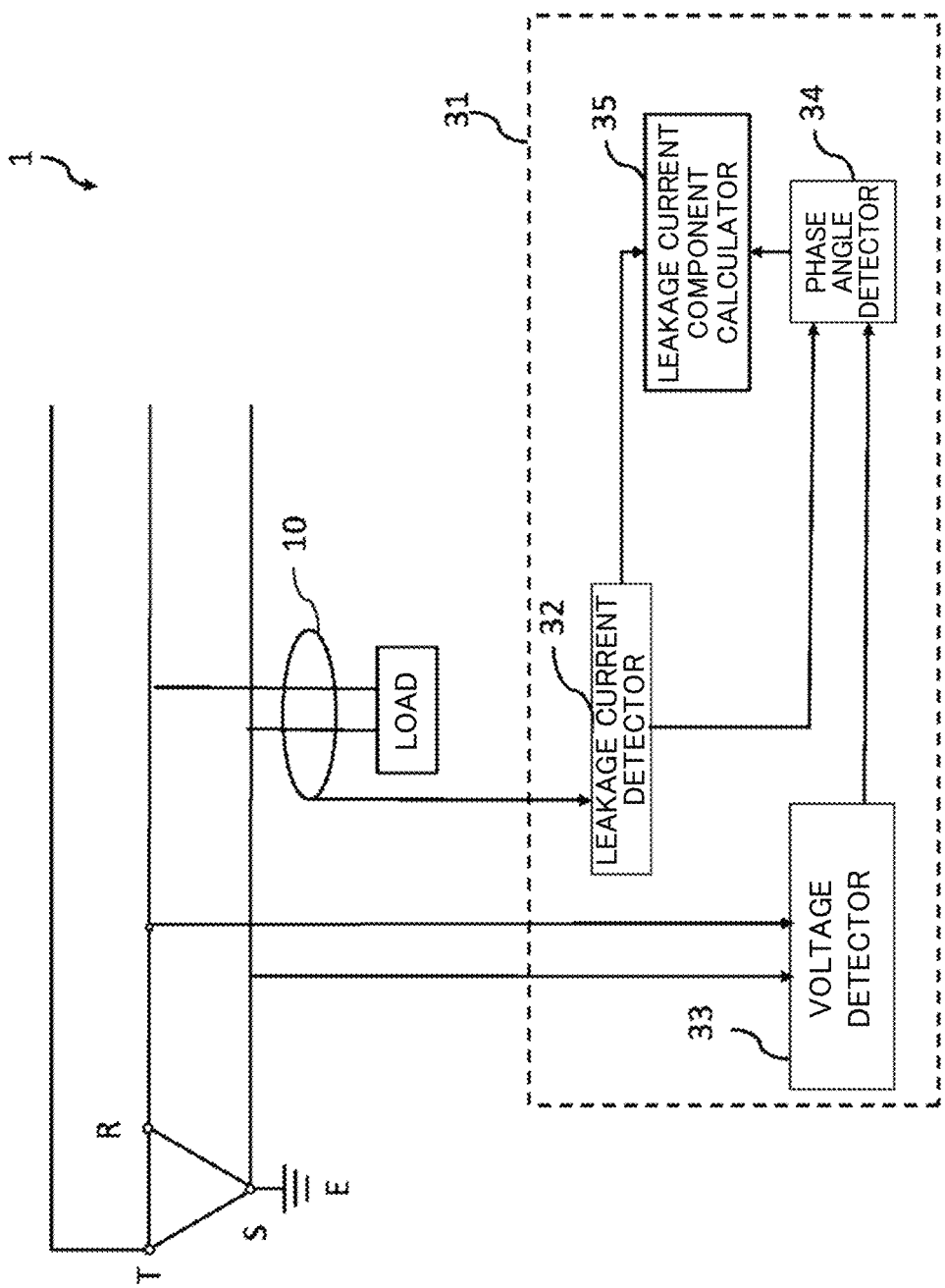
FIG. 10 is a block diagram illustrating the configuration of a third measurement unit.

FIG. 10 is a block diagram illustrating the configuration of the third measurement unit 31. Specifically, FIG. 10 is a block diagram illustrating the configuration of the third measurement unit 31 and a diagram illustrating a connection state between the third measurement unit 31 and the wireway to be measured in a state in which the controller 55 recognizes the third state and the selection processor 51 selects the third measurement unit 31. The third measurement unit 31 includes the leakage current detector 32, the voltage detector 33, a phase angle calculator 34, and an ground insulation resistance leakage current component calculator (hereinafter referred to as a leakage current component calculator) 35.

The leakage current detector 32 detects a leakage current flowing in the wireway to be measured to which the load is connected. The leakage current detector 32 detects a leakage current flowing in a single-phase circuit branched from the delta (Δ) connection of the first phase, the second phase, and the third phase. While the first, second, and third phases are hereinafter referred to as "R-phase," "S-phase," and "T-phase," respectively, the names are not limited thereto. While the leakage current measured by the leakage current detector 32 will be hereinafter referred to as "Io," the name is not limited thereto. In the present embodiment, the S-phase is grounded, but the R-phase or the T-phase may be grounded.

A zero-phase current transformer (ZCT) 10 is connected to the leakage current detector 32. The zero-phase current transformer 10 is configured to clamp the wireways collectively. For example, the zero-phase current transformer 10 may be configured as a handy-type split-core zero-phase current transformer, which makes it possible for an operator to easily place the current transformer to the wireways on site. The leakage current detector 32 detects (calculates) an Io flowing in the wireway to be measured, from a signal measured by the zero-phase current transformer 10.

The voltage detector 33 detects a voltage applied between the phases to which the load is connected. FIG. 10 illustrates an example in which the load is disposed between the R-phase and the S-phase. The voltage detector 33 detects a voltage applied between the R-phase and the S-phase. The load may be disposed between the T-phase and the S-phase. In the case in which the load is disposed between the T-phase and the S-phase, the voltage detector 33 detects a voltage applied between the T-phase and the S-phase.

The phase angle calculator 34 calculates a phase angle based on the leakage current detected by the leakage current detector 32 and the voltage detected by the voltage detector 33. Specifically, the phase angle calculator 34 detects the phase angle (θ) through arithmetic processing of the waveform of the leakage current (Io) detected by the leakage current detector 32 and the waveform of the voltage (e.g., reference voltage $V_{R-S}$) detected by the voltage detector 33. For example, the phase angle calculator 34 detects the phase angle (θ) between the reference voltage $V_{R-S}$ and the leakage current (Io) based on the zero-crossing point of the reference voltage $V_{R-S}$ and the zero-crossing point of the leakage current (Io). The arithmetic processing for calculating the phase angle may be performed by synchronous detection or discrete Fourier transform (DFT). The configuration in the case of using the synchronous detection will be described later.

The leakage current component calculator 35 calculates, according to the equation (3) above, a leakage current component Ior caused by a ground insulation resistance included in the leakage current from the leakage current (Io) detected by the leakage current detector 32 and the phase angle θ calculated by the phase angle calculator 34.

The above-described leakage current, voltage, phase angle, and leakage current component caused by the ground insulation resistance are included in the wireway electricity related value.

In this manner, the measurement apparatus 1 including the third measurement unit 31 can accurately calculate the Ior caused in the single-phase circuit branched from the delta connection based on the leakage current (Io) detected by the leakage current detector 32 and the phase angle (phase difference) calculated by the phase angle calculator 34. That is, the third measurement unit 31 is a measurement unit used in a case where the load is disposed between the R-phase and the S-phase (grounded phase) or between the T-phase and the S-phase (grounded phase) in the delta connection and is operated as the single-phase circuit.

Here, a potential difference between E (earth) and the S-phase (grounded phase) (between the S-phase and the ground) is basically 0 [V], and a predetermined voltage (for example, 200 [V]) is applied between the E and the R-phase and between the E and the T-phase (between each phase and the ground). The load is disposed between the S-phase and the R-phase or between the S-phase and the T-phase to which the single-phase circuit is connected. The second measurement unit 21 detects a voltage V between the phases between which the load is disposed, obtains a phase difference (θ) between the waveform (sine wave) of the voltage V and the waveform of a leakage current (Io) input from the zero-phase current transformer (ZCT) 10, and calculates the Ior by substituting the leakage current (Io) and the phase difference (θ) into the equation (3).

The measurement apparatus 1 can measure and calculate, as wireway electricity related values, various numerical values including the above-described leakage current (Io) and Ior, such as a current value, a power value, and the temporal histories and temporal variations thereof. The measurement apparatus 1 can also inspect or monitor the wireway to be measured using the wireway electricity related value.

Figure 11:
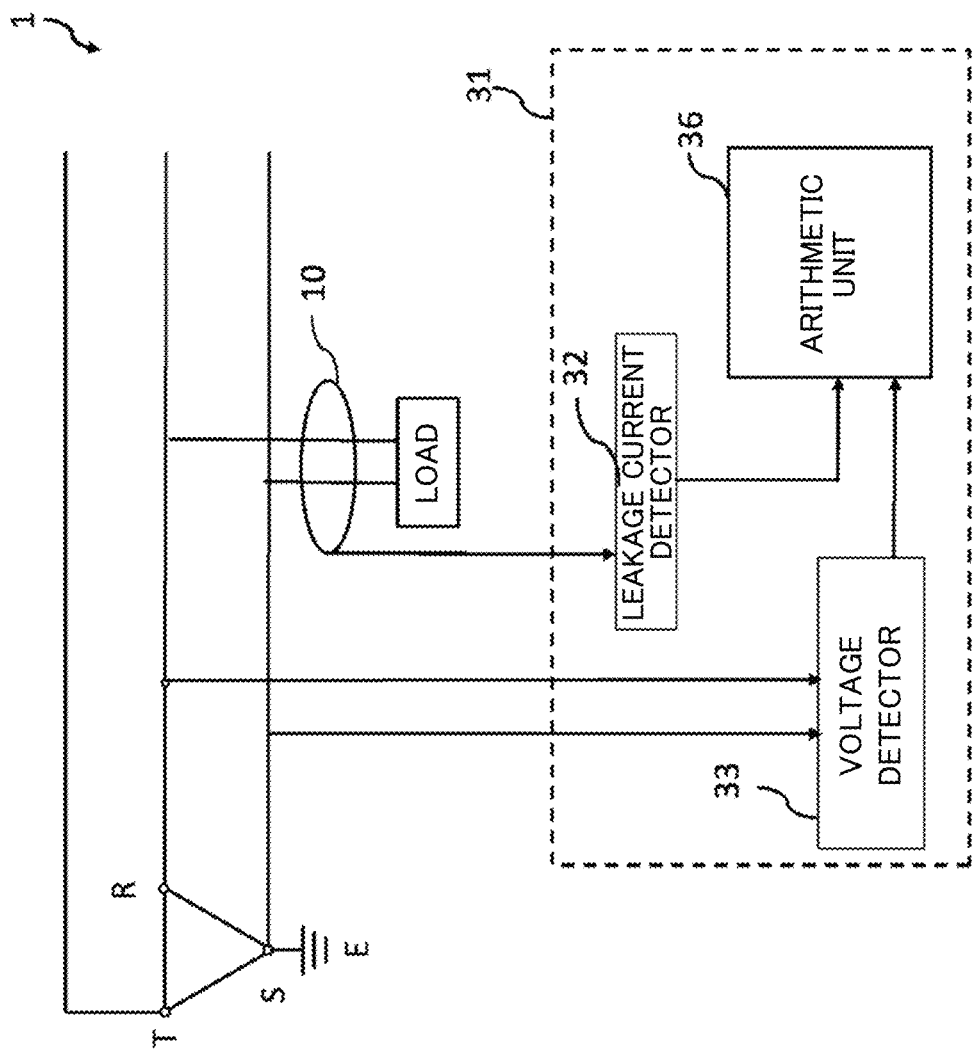
FIG. 11 is a block diagram illustrating a variation of the third measurement unit.

The configuration of the third measurement unit 31 is one example, and is not limited to the above-described configuration. As illustrated in FIG. 11, the third measurement unit 31 may include an arithmetic unit 36 instead of the phase angle detector 34 and the leakage current component calculator 35.

The arithmetic unit 36 calculates a leakage current component Ior(Io×cosθ) caused by a ground insulation resistance by integration by synchronous detection based on (the waveform of) the leakage current detected by the leakage current detector 32 and (the waveform of) the voltage detected by the voltage detector 33. The integration by the synchronous detection is to calculate Io×cosθ by integrating the waveform in a predetermined range such as 0 to 180 degrees, and one specific example will be described below. The integration by the synchronous detection is not limited to the following calculation.

The arithmetic unit 36 performs predetermined processing on the voltage value (voltage waveform) detected by the voltage detector 33 and the leakage current (current waveform) detected by the leakage current detector 32, outputs a parameter signal of a logical signal, performs full-wave rectification on the leakage current (current waveform) detected by the leakage current detector 32, performs quantized transform on the full-wave rectified current waveform by a continuous ΔΣ ADC, and measures parameters of logical signals of sin and cos parts generated by the quantized transform and the average of the current waveform obtained by the continuous ΔΣ ADC. Specifically, the arithmetic unit 36 performs logical processing on the voltage value (voltage waveform) detected by the voltage detector 33 to generate a first logical signal, performs logical processing on the leakage current (current waveform) detected by the leakage current detector 32 to generate a second logical signal, performs arithmetic processing on the first logical signal and the second logical signal, and outputs a positive/negative or Hi/Lo signal (first signal). Moreover, the arithmetic unit 36 generates zero-crossing points when the first logical signal changes, stores a time between the generated zero-crossing points, inverts the first logical signal during a period in which a time from a next zero-crossing point is the half of the stored time or less, performs phase conversion on the first logical signal, performs arithmetic processing on the phase-converted voltage waveform and the second logical signal, and outputs a positive/negative or Hi/Lo signal (second signal). The arithmetic unit 36 can obtain the average of a desired type of current value by performing counting by the quantized transform by the continuous ΔΣ ADC based on the first signal and the second signal. The desired type of current value includes an AC value measurement, and an input current I [A], an active current Ir=Icosθ [A], and a reactive current IL−IC=Isinθ [A] can be obtained. Here, the above-described "active current Ir=Icosθ" is the leakage current component Ior caused by the ground insulation resistance.

According to such a configuration, there is an advantage that the leakage current component Ior caused by the ground insulation resistance can be calculated without calculation of the phase angle.

<Configuration and Operation of Fourth Measurement Unit 41>

Specific configuration and operation of the fourth measurement unit 41 will be described. The fourth measurement unit 41 operates in the fourth state in which the three-phase AC power source in which the first phase, the second phase, and the third phase are delta-connected and any one of these phases is grounded is connected to the wireway to be measured and the load is connected to the non-grounded two phases.

Figure 12:
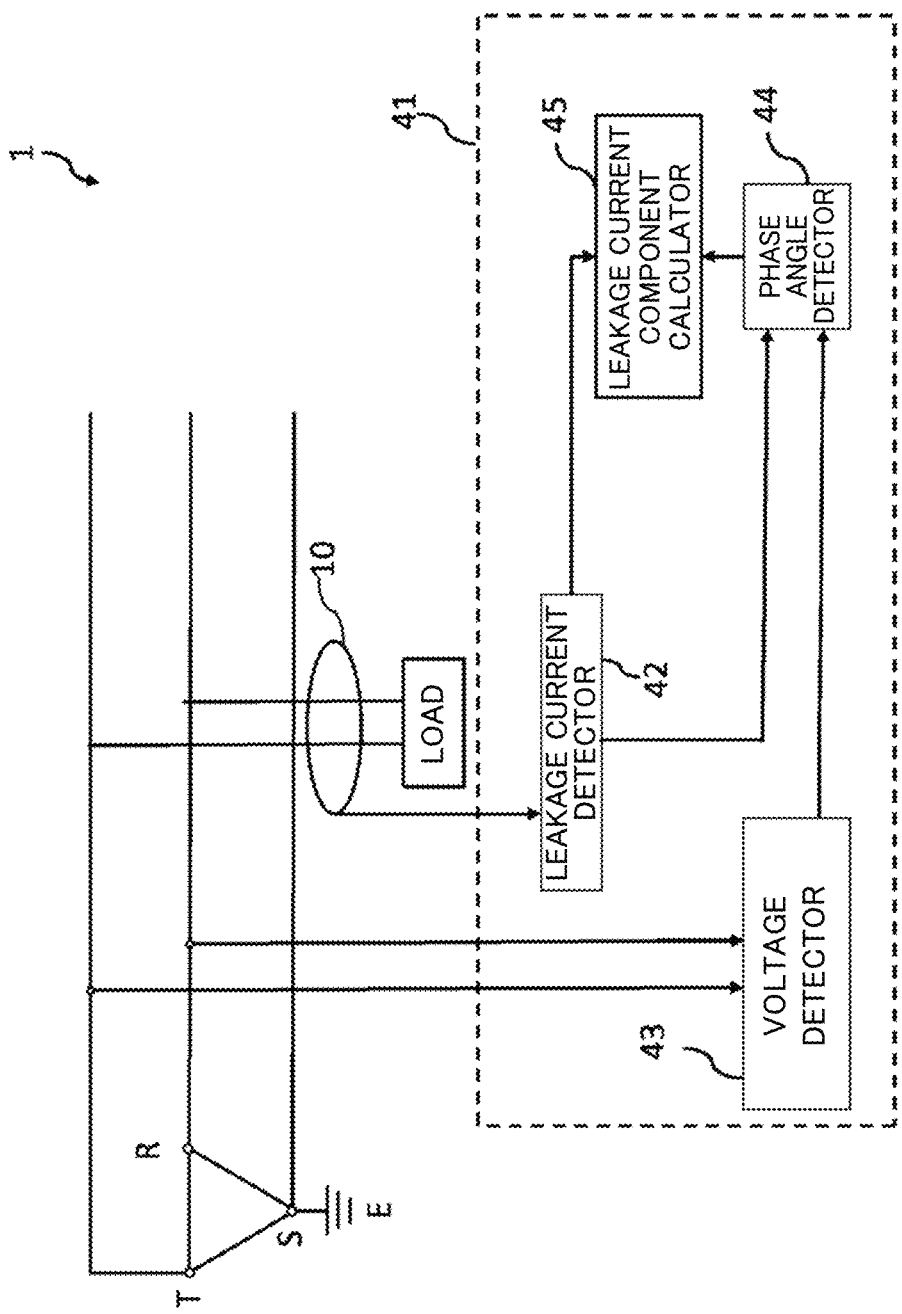
FIG. 12 is a block diagram illustrating the configuration of a fourth measurement unit.

FIG. 12 is a block diagram illustrating the configuration of the fourth measurement unit 41. Specifically, FIG. 12 is a block diagram illustrating the configuration of the fourth measurement unit 41 and a diagram illustrating a connection state between the fourth measurement unit 41 and the wireway to be measured in a state in which the controller 55 recognizes the fourth state and the selection processor 51 selects the fourth measurement unit 41. The fourth measurement unit 41 includes the leakage current detector 42, the voltage detector 43, a phase angle calculator 44, and an ground insulation resistance leakage current component calculator (hereinafter referred to as a leakage current component calculator) 45.

The leakage current detector 42 detects a leakage current flowing in the wireway to be measured to which the load is connected. The leakage current detector 42 detects a leakage current flowing in a single-phase circuit branched from the delta (Δ) connection of the first phase, the second phase, and the third phase. While the first, second, and third phases are hereinafter referred to as "R-phase," "S-phase," and "T-phase," respectively, the names are not limited thereto. While the leakage current measured by the leakage current detector 42 will be hereinafter referred to as "Io," the name is not limited thereto. In the present embodiment, the S-phase is grounded, but the R-phase or the T-phase may be grounded.

A zero-phase current transformer (ZCT) 10 is connected to the leakage current detector 42. The zero-phase current transformer 10 is configured to clamp the wireways collectively. For example, the zero-phase current transformer 10 may be configured as a handy-type split-core zero-phase current transformer, which makes it possible for an operator to easily place the current transformer to the wireways on site. The leakage current detector 42 detects (calculates) an Io flowing in the wireway to be measured, from a signal measured by the zero-phase current transformer 10.

The voltage detector 43 detects a voltage applied between the phases to which the load is connected. FIG. 12 illustrates an example where the load is disposed between the R-phase and the T-phase. The voltage detector 43 detects a voltage applied between the R-phase and the T-phase.

The phase angle calculator 44 calculates a phase angle based on the leakage current detected by the leakage current detector 42 and the voltage detected by the voltage detector 43. Specifically, the phase angle calculator 44 detects the phase angle (θ) through arithmetic processing of the waveform of the leakage current (Io) detected by the leakage current detector 42 and the waveform of the voltage (e.g., reference voltage $V_{R-T}$) detected by the voltage detector 43. For example, the phase angle calculator 44 detects the phase angle (θ) between the reference voltage $V_{R-T}$ and the leakage current (Io) based on the zero-crossing point of the reference voltage $V_{R-T}$ and the zero-crossing point of the leakage current (Io). The arithmetic processing for calculating the phase angle may be performed by synchronous detection or discrete Fourier transform (DFT). The configuration in the case of using the synchronous detection will be described later.

The leakage current component calculator 45 calculates, according to equation (4) above, a leakage current component Ior caused by a ground insulation resistance included in the leakage current from the leakage current (Io) detected by the leakage current detector 42 and the phase angle θ calculated by the phase angle calculator 44.

The above-described leakage current, voltage, phase angle, and leakage current component caused by the ground insulation resistance are included in the wireway electricity related value.

In this manner, the measurement apparatus 1 including the fourth measurement unit 41 can accurately calculate the Ior caused in the single-phase circuit branched from the delta connection based on the leakage current (Io) detected by the leakage current detector 42 and the phase angle (phase difference) calculated by the phase angle calculator 44. That is, the fourth measurement unit 41 is a measurement unit used in a case where the load is disposed between the non-grounded phases (between the R-phase and the T-phase in the delta connection and is operated as the single-phase circuit.

For example, in a case where the load is connected as the single-phase circuit between the R-phase and the T-phase, the voltage between the E (earth) and the R-phase and the voltage between the E and the T-phase are the same as each other (for example, 200 [V]). The load is disposed between the R-phase and the T-phase. The fourth measurement unit 41 detects a voltage V between the phases between which the load is disposed, obtains a phase difference (θ) between the waveform (sine wave) of the voltage V and the waveform of a leakage current (Io) input from the zero-phase current transformer (ZCT) 10, and calculates the Ior by substituting the leakage current (Io) and the phase difference (θ) into the equation (4).

Here, the R-phase and the T-phase have the same potential difference with respect to the ground. In this case, even if floating capacitances are caused in the R-phase and the T-phase, the same amount of floating capacitance is caused in both phases, and the floating capacitances are not unbalanced.

Figure 14:
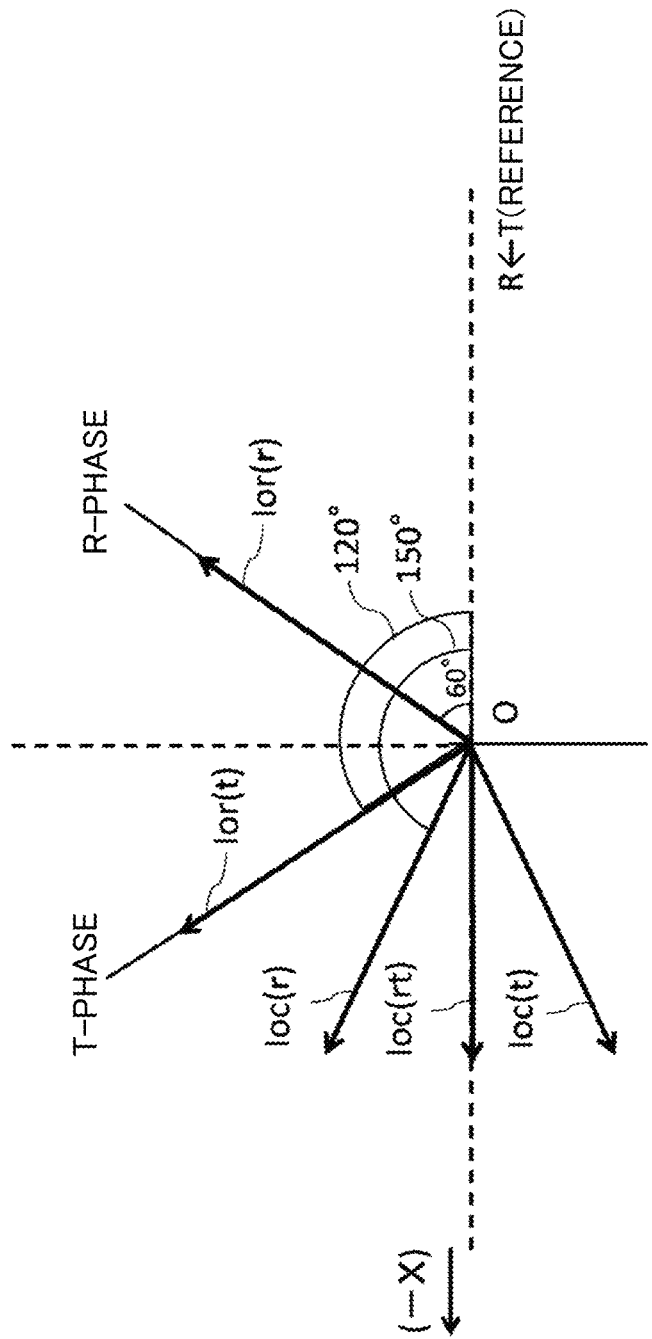
FIG. 14 is a diagram schematically illustrating vector representations of Ior and Ioc of each phase in delta connection.

Here, a reason why the unbalance does not occur will be described below. When the voltage between the R-phase and the T-phase is detected by the voltage detector 43 and a reference point is obtained from the detected voltage, the axis of the R-phase is at a position of 60 degrees from the reference point, and the axis of the T-phase is at a position of 120 degrees from the reference point, as illustrated in FIG. 14. Further, since a phase difference between the Ior (hereinafter referred to as Ior(r)) of the R-phase and the reference point is 60 degrees, the Ior(r) is caused on the axis of the R-phase. Since a phase difference between the Ior (hereinafter referred to as Ior(t)) of the T-phase and the reference point is 120 degrees, the Ior(t) is caused on the axis of the T-phase.

The Ioc (hereinafter referred to as Ioc(r)) of the R-phase is caused at a position of 90 degrees from the axis of the R-phase, and therefore, is caused at a position of 150 degrees. The Ioc(hereinafter referred to as Ioc(t)) of the T-phase is caused at a position of 90 degrees from the axis of the T-phase, and therefore, is caused at a position of 210 degrees. In a case where the Ioc(r) and the Ioc(t) are balanced, an Ioc(rt) obtained by combining the Ioc(r) and the Ioc(t) (vector combination) is caused in a direction of 180 degrees from the reference axis ("–X" direction in FIG. 14). That is, the Ioc(r) caused in the R-phase and the Ioc(t) caused in the T-phase are not unbalanced.

The measurement apparatus 1 can measure and calculate, as wireway electricity related values, various numerical values including the above-described leakage current (Io) and Ior, such as a current value, a power value, and the temporal histories and temporal variations thereof. The measurement apparatus 1 can also inspect or monitor the wireway to be measured using the wireway electricity related value.

Figure 13:
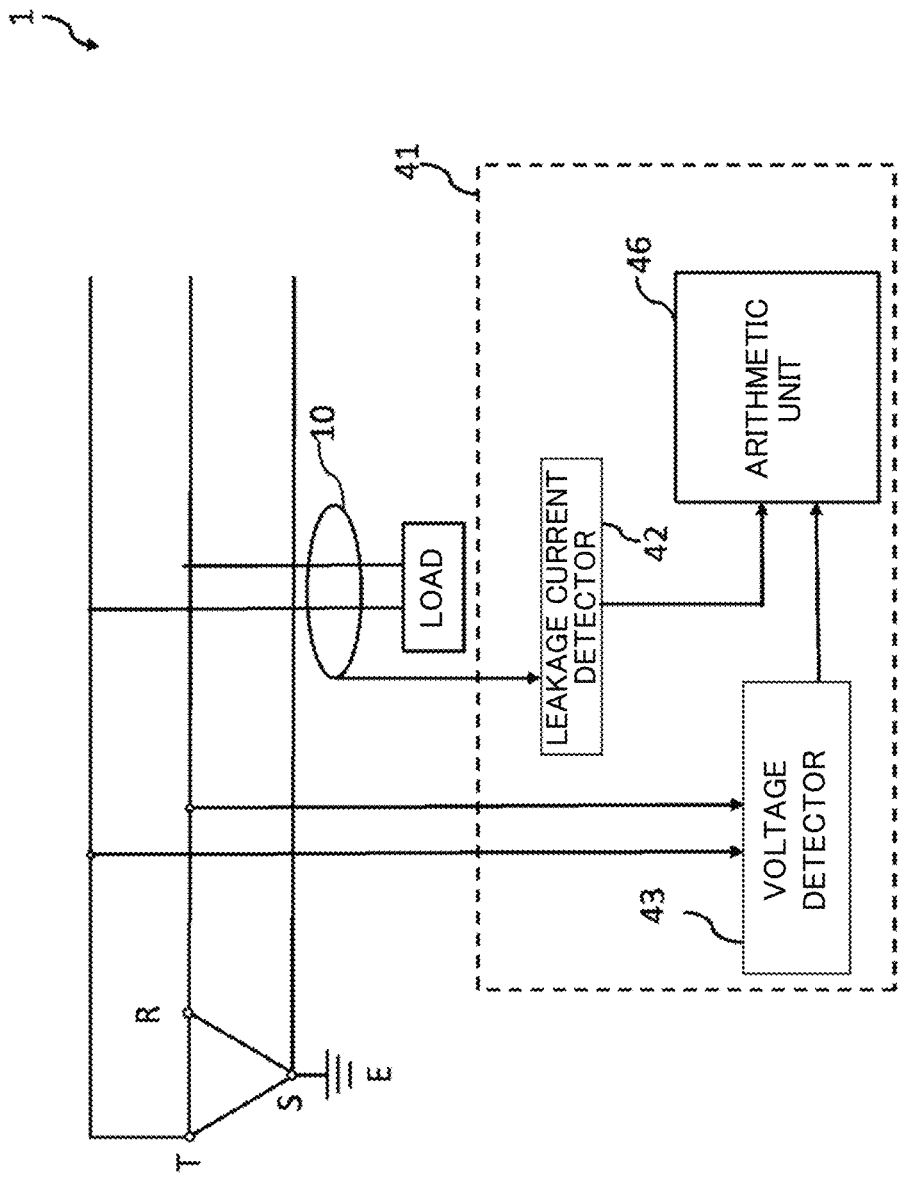
FIG. 13 is a block diagram illustrating a variation of the fourth measurement unit.

The configuration of the fourth measurement unit 41 is one example, and is not limited to the above-described configuration. As illustrated in FIG. 13, the fourth measurement unit 41 may include an arithmetic unit 46 instead of the phase angle detector 44 and the leakage current component calculator 45.

The arithmetic unit 46 calculates a leakage current component Ior(Io×sinθ/cos30°) caused by a ground insulation resistance by integration by synchronous detection based on (the waveform of) the leakage current detected by the leakage current detector 42 and (the waveform of) the voltage detected by the voltage detector 43. The integration by the synchronous detection is to calculate Io×sinθ by integrating the waveform in a predetermined range such as 90 to 270 degrees and divide Io×sinθ by cos30°, and one specific example will be described below. The integration by the synchronous detection is not limited to the following calculation.

The arithmetic unit 46 performs predetermined processing on the voltage value (voltage waveform) detected by the voltage detector 43 and the leakage current (current waveform) detected by the leakage current detector 42, outputs a parameter signal of a logical signal, performs full-wave rectification on the leakage current (current waveform) detected by the leakage current detector 42, performs quantized transform on the full-wave rectified current waveform by a continuous ΔΣ ADC, and measures parameters of logical signals of sin and cos parts generated by the quantized transform and the average of the current waveform obtained by the continuous ΔΣ ADC. Specifically, the arithmetic unit 46 performs logical processing on the voltage value (voltage waveform) detected by the voltage detector 43 to generate a first logical signal, performs logical processing on the leakage current (current waveform) detected by the leakage current detector 42 to generate a second logical signal, performs arithmetic processing on the first logical signal and the second logical signal, and outputs a positive/negative or Hi/Lo signal (first signal). Moreover, the arithmetic unit 46 generates zero-crossing points when the first logical signal changes, stores a time between the generated zero-crossing points, inverts the first logical signal during a period in which a time from a next zero-crossing point is the half of the stored time or less, performs phase conversion on the first logical signal, performs arithmetic processing on the phase-converted voltage waveform and the second logical signal, and outputs a positive/negative or Hi/Lo signal (second signal). The arithmetic unit 46 can obtain the average of a desired type of current value by performing counting by the quantized transform by the continuous ΔΣ ADC based on the first signal and the second signal. The desired type of current value includes an AC value measurement, and an input current I [A], an active current Ir=Icosθ [A], and a reactive current IL−IC=Isinθ [A] can be obtained. The arithmetic unit 46 divides the "reactive current IL−IC=Isinθ" by cos30° to calculate the leakage current component Ior caused by the ground insulation resistance.

According to such a configuration, there is an advantage that the leakage current component Ior caused by the ground insulation resistance can be calculated without calculation of the phase angle.

In the present embodiment, the first measurement unit 11, the second measurement unit 21, the third measurement unit 31, and the fourth measurement unit 41 are independently configured, but the present disclosure is not limited thereto. For example, the leakage current detectors 12, 22, 32, 42 may be configured as one unit, the voltage detectors 13, 23, 33, 43 may be configured as one unit, the phase angle calculators 14, 24, 34, 44 may be configured as one unit, and the leakage current component calculators 15, 25, 35, 45 may be configured as one unit.

Figure 15:
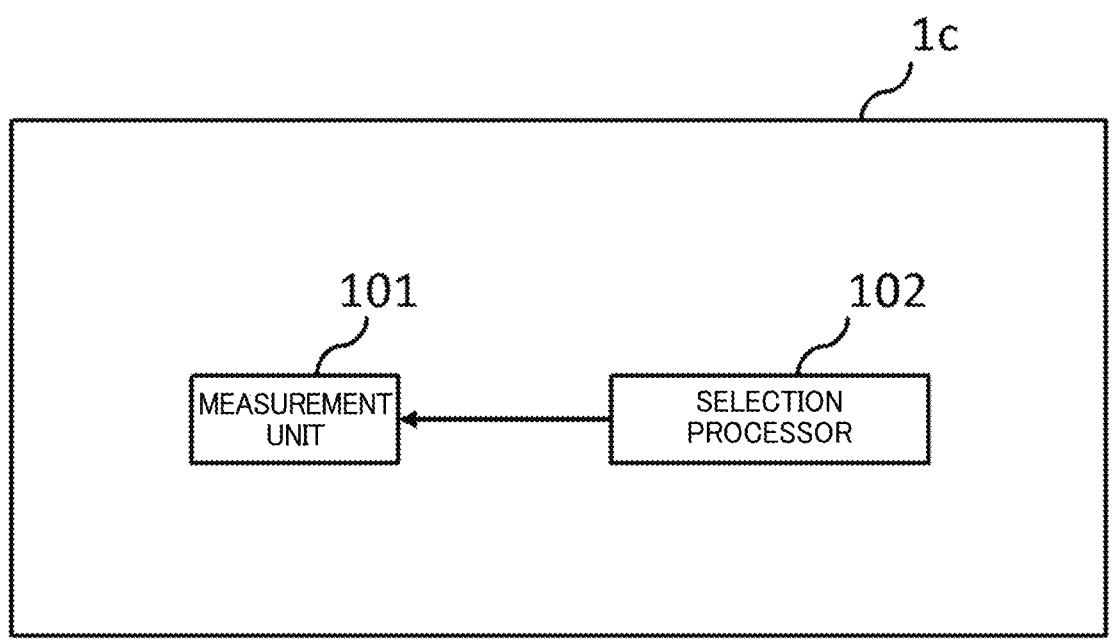
FIG. 15 is a diagram showing another configuration of the measurement apparatus.

FIG. 15 is a diagram showing another configuration of a measurement apparatus 1c. The measurement apparatus 1c includes a measurement unit 101 and a selection processor 102.

The measurement unit 101 measures a wireway electricity related value which is a value related to electricity of a wireway branched from a wireway to be measured to which a star-connected or delta-connected three-phase AC power source is connected and branched from a three-phase AC to a single-phase AC and distributed.

The selection processor 102 selects one state from two or more of a first state in which a three-phase AC power source in which a first phase, a second phase, a third phase, and a neutral line are star-connected is connected to a wireway to be measured and a load is connected to any one of the first phase, the second phase, or the third phase and the neutral line, a second state in which a three-phase AC power source in which a first phase, a second phase, and a third phase are star-connected is connected to a wireway to be measured and a load is connected to any two of the first phase, the second phase, and the third phase, a third state in which a three-phase AC power source in which a first phase, a second phase, and a third phase are delta-connected and any one of the phases is grounded is connected to a wireway to be measured and a load is connected to the grounded phase and any one of the non-grounded phases, and a fourth state in which a three-phase AC power source in which a first phase, a second phase, and a third phase are delta-connected and any one of the phases is grounded is connected to a wireway to be measured and a load is connected to the non-grounded two phases.

In a case where the selection processor 102 selects the first state or the third state, the measurement unit 101 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between any one of the first phase, the second phase, or the third phase to which the load is connected and the neutral line:

$$Ior = Io \times \cos\theta.$$

In a case where the selection processor 102 selects the second state, the measurement unit 101 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between the two phases to which the load is connected:

$$Ior = Io \times \sin\theta/\cos 60°.$$

In a case where the selection processor 102 selects the fourth state, the measurement unit 101 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between the phases to which the load is connected:

$$Ior = Io \times \sin\theta/\cos30°.$$

<Measurement Method>

Figure 16:
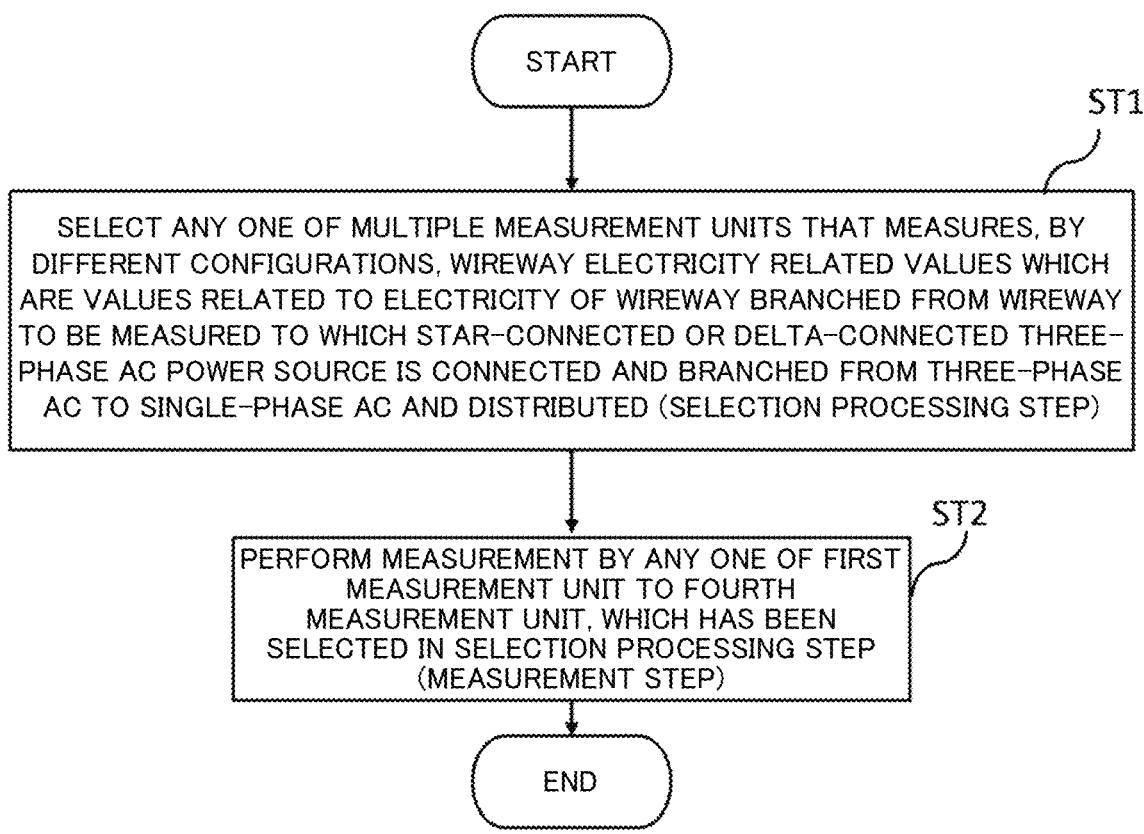
FIG. 16 is a flowchart for describing a procedure of a measurement method.

Here, a measurement method by the measurement apparatus 1 will be described. FIG. 16 is a flowchart for describing a procedure of the measurement method.

In a step ST1, the selection processor 51 selects any one of the plurality of measurement units configured to measure, by different configurations, wireway electricity related values which are values related to electricity of a wireway branched from a wireway to be measured to which a star-connected or delta-connected three-phase AC power source is connected and branched from a three-phase AC to a single-phase AC and distributed (selection processing step).

In a step ST2, the measurement unit 2 performs measurement by any one of the first measurement unit 11 to the fourth measurement unit 41, which has been selected in the selection processing step (measurement step).

Here, the first measurement unit 11 measures, by the first configuration, the wireway electricity related value which is the value related to the electricity of the wireway branched from the wireway to be measured to which the star-connected three-phase AC power source is connected and branched from the three-phase AC to the single-phase AC and distributed.

The second measurement unit 21 measures, by the second configuration, a wireway electricity related value which is a value related to electricity of a wireway branched from a wireway to be measured to which a star-connected three-phase AC power source is connected and branched from a three-phase AC to a single-phase AC and distributed.

The third measurement unit 31 measures, by the third configuration, a wireway electricity related value which is a value related to electricity of a wireway branched from a wireway to be measured to which a delta-connected three-phase AC power source is connected and branched from a three-phase AC to a single-phase AC and distributed.

The fourth measurement unit 41 measures, by the fourth configuration, a wireway electricity related value which is a value related to electricity of a wireway branched from a wireway to be measured to which a delta-connected three-phase AC power source is connected and branched from a three-phase AC to a single-phase AC and distributed.

The measurement unit 2 includes any two or more of the first measurement unit 11 to the fourth measurement unit 41. In the measurement method, in a case where the three-phase AC output from the three-phase AC power source is converted into the single-phase AC and the load is connected to the wireway in which the single-phase AC flows, the measurement unit can be switched to the measurement unit (the above-described first measurement unit 11 to fourth measurement unit 41) suitable for the state (the above-described first to fourth states) of the three-phase AC power source, and the Ior of such a wireway can be accurately calculated.

In the selection processing step, the first measurement unit 11 is selected in the case of the first state in which the three-phase AC power source in which the first phase, the second phase, the third phase, and the neutral line are star-connected is connected to the wireway to be measured and the load is connected to any one of the first phase, the second phase, or the third phase and the neutral line.

In the selection processing step, the second measurement unit 21 is selected in the case of the second state in which the three-phase AC power source in which the first phase, the second phase, and the third phase are star-connected is connected to the wireway to be measured and the load is connected to any two of the first phase, the second phase, and the third phase.

In the selection processing step, the third measurement unit 31 is selected in the case of the third state in which the three-phase AC power source in which the first phase, the second phase, and the third phase are delta-connected and any one of these phases is grounded is connected to the wireway to be measured and the load is connected to the grounded phase and any one of the non-grounded phases.

In the selection processing step, the fourth measurement unit 41 is selected in the case of the fourth state in which the three-phase AC power source in which the first phase, the second phase, and the third phase are delta-connected and any one of these phases is grounded is connected to the wireway to be measured and the load is connected to the non-grounded two phases.

As the first configuration, the first measurement unit 11 calculates, according to the following equation, the leakage current component Ior caused by the ground insulation resistance included in the leakage current Io flowing in the wireway to be measured based on the phase angle θ calculated from the leakage current Io and the voltage applied between any one of the first phase, the second phase, or the third phase to which the load is connected and the neutral line:

$$Ior = Io \times \cos\theta.$$

The above-described leakage current, voltage, phase angle, and leakage current component caused by the ground insulation resistance are included in the wireway electricity related value.

As the second configuration, the second measurement unit 21 calculates, according to the following equation, the leakage current component Ior caused by the ground insulation resistance included in the leakage current Io flowing in the wireway to be measured based on the phase angle θ calculated from the leakage current Io and the voltage applied between the two phases to which the load is connected:

$$Ior = Io \times \sin\theta/\cos60°.$$

The above-described leakage current, voltage, phase angle, and leakage current component caused by the ground insulation resistance are included in the wireway electricity related value.

As the third configuration, the third measurement unit 31 calculates, according to the following equation, the leakage current component Ior caused by the ground insulation resistance included in the leakage current Io flowing in the wireway to be measured based on the phase angle θ calculated from the leakage current Io and the voltage applied between the phases to which the load is connected:

$$Ior = Io \times \cos\theta.$$

The above-described leakage current, voltage, phase angle, and leakage current component caused by the ground insulation resistance are included in the wireway electricity related value.

As the fourth configuration, the fourth measurement unit 41 calculates, according to the following equation, the leakage current component Ior caused by the ground insulation resistance included in the leakage current Io flowing in the wireway to be measured based on the phase angle θ calculated from the leakage current Io and the voltage applied between the phases to which the load is connected:

$$Ior = Io \times \sin\theta/\cos 30°.$$

The above-described leakage current, voltage, phase angle, and leakage current component caused by the ground insulation resistance are included in the wireway electricity related value.

Figure 17:
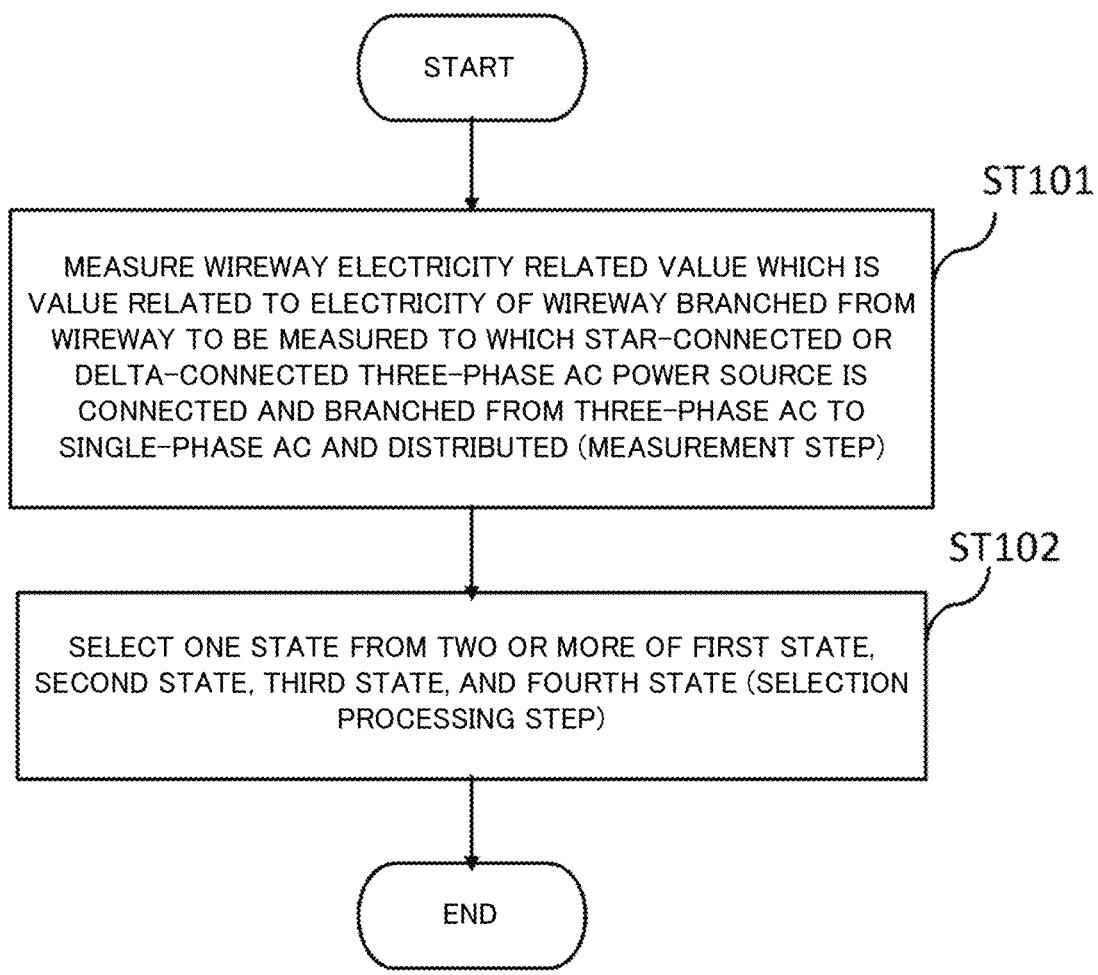
FIG. 17 is a flowchart for describing another procedure of the measurement method.

Next, another measurement method by the measurement apparatus 1 will be described. FIG. 17 is a flowchart for describing a procedure of the another measurement method.

In a step ST101, the measurement unit 101 measures a wireway electricity related value which is a value related to electricity of a wireway branched from a wireway to be measured to which a star-connected or delta-connected three-phase AC power source is connected and branched from a three-phase AC to a single-phase AC and distributed (measurement step).

In a step ST102, the selection processor 102 selects one state from two or more of a first state in which a three-phase AC power source in which a first phase, a second phase, a third phase, and a neutral line are star-connected is connected to a wireway to be measured and a load is connected to any one of the first phase, the second phase, or the third phase and the neutral line, a second state in which a three-phase AC power source in which a first phase, a second phase, and a third phase are star-connected is connected to wireway to be measured and a load is connected to any two of the first phase, the second phase, and the third phase, a third state in which a three-phase AC power source in which a first phase, a second phase, and a third phase are delta-connected and any one of the phases is grounded is connected to a wireway to be measured and a load is connected to the grounded phase and any one of the non-grounded phases, and a fourth state in which a three-phase AC power source in which a first phase, a second phase, and a third phase are delta-connected and any one of the phases is grounded is connected to a wireway to be measured and a load is connected to the non-grounded two phases (selection processing step).

In a case where the first state or the third state is selected in the selection processing step, the measurement unit 101 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between any one of the first phase, the second phase, or the third phase to which the load is connected and the neutral line:

$$Ior = Io \times \cos\theta.$$

In a case where the second state is selected in the selection processing step, the measurement unit 101 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between the two phases to which the load is connected:

$$Ior = Io \times \sin\theta/\cos 60°.$$

In a case where the fourth state is selected in the selection processing step, the measurement unit 101 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between the phases to which the load is connected:

$$Ior = Io \times \sin\theta/\cos 30°.$$

(Measurement Program)

A measurement program for switching a measurement unit to a measurement unit suitable for the state of a three-phase AC power source and accurately calculating the Ior of a wireway in a case where a three-phase AC output from the three-phase AC power source is converted into a single-phase AC and a load is connected to the wireway in which the single-phase AC flows mainly includes the following steps, and is implemented by a computer 500 (hardware).

Step 1: selecting any one of a plurality of measurement units configured to measure, by different configurations, wireway electricity related values which are values related to electricity of a wireway branched from a wireway to be measured to which a star-connected or delta-connected three-phase AC power source is connected and branched from a three-phase AC to a single-phase AC and distributed (selection processing step).

Step 2: performing measurement by any one of the first measurement unit 11 to the fourth measurement unit 41, which has been selected in the selection processing step (measurement step).

Here, the first measurement unit 11 measures, by the first configuration, the wireway electricity related value which is the value related to the electricity of the wireway branched from the wireway to be measured to which the star-connected three-phase AC power source is connected and branched from the three-phase AC to the single-phase AC and distributed (first measurement step).

The second measurement unit 21 measures, by the second configuration, the wireway electricity related value which is the value related to the electricity of the wireway branched from the wireway to be measured to which the star-connected three-phase AC power source is connected and branched from the three-phase AC to the single-phase AC and distributed (second measurement step).

The third measurement unit 31 measures, by the third configuration, the wireway electricity related value which is the value related to the electricity of the wireway branched from the wireway to be measured to which the delta-connected three-phase AC power source is connected and branched from the three-phase AC to the single-phase AC and distributed (third measurement step).

The fourth measurement unit 41 measures, by the fourth configuration, the wireway electricity related value which is the value related to the electricity of the wireway branched from the wireway to be measured to which the delta-connected three-phase AC power source is connected and branched from the three-phase AC to the single-phase AC and distributed (fourth measurement step).

The measurement unit 2 includes any two or more of the first measurement unit 11 to the fourth measurement unit 41.

Figure 18:
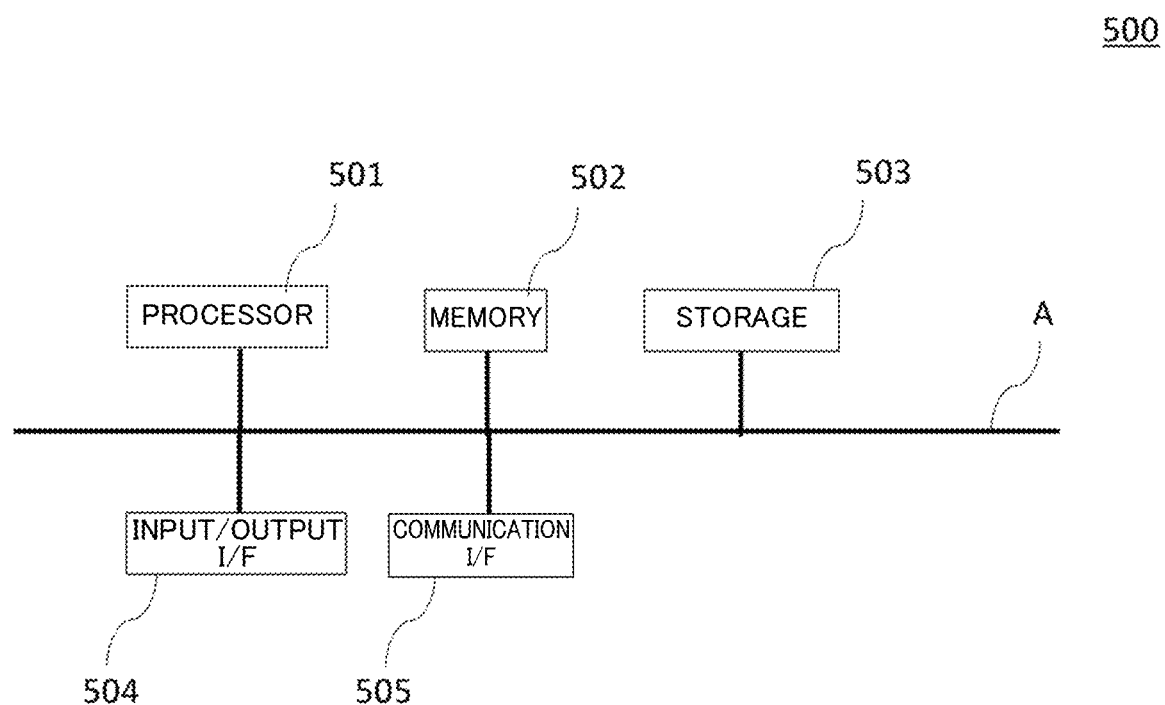
FIG. 18 is a block diagram illustrating a first configuration example of a computer.

Here, the configuration and operation of the computer 500 will be described with reference to FIG. 18. As illustrated in FIG. 18, the computer 500 is configured by connecting a processor 501, a memory 502, a storage 503, an input/output I/F 504, and a communication I/F 505 on a bus A. These components cooperate with each other to fulfill the functions and/or method described in the present disclosure.

For example, a display for displaying various types of information, a touch panel operated by the user, and other devices are connected to the input/output I/F 504. The touch panel is disposed on the front surface of the display. This configuration allows an intuitive operation of the user through a touch or any other suitable operation of icons on the display with a finger. The touch panel does not have to be disposed on the front surface of the display. Instead of or in addition to the touch panel, a keyboard or a pointing device, such as a mouse, may be connected to the input/output I/F 504. A speaker configured to output sound to the outside, or a microphone configured to receive external sound may be connected to the input/output I/F 504.

The display is a liquid crystal display, an organic electroluminescence (EL) display, or any other suitable display that displays various types of information under control by the processor 501.

The memory 502 is composed of a random-access memory (RAM). The RAM is composed of a volatile or non-volatile memory.

The storage 503 is composed of a read-only memory (ROM). The ROM is composed of a non-volatile memory and may be configured as, for example, a hard disk drive (HDD) or a solid-state drive (SSD). The storage 503 stores various types of programs, such as the measurement program executed in Steps 1 to 2 described above.

For example, the processor 501 controls the overall operation of the computer 500. The processor 501 is an arithmetic device that loads an operating system and various programs fulfilling various functions, from the storage 503 into the memory 502 and executes commands included in the loaded programs.

Specifically, upon input of operation by the user, the processor 501 reads out a program (e.g., the measurement program of the present embodiment) stored in the storage 503, deploys the read program in the memory 502, and executes the program. The processor 501 executes the measurement program to implement the functions of the first measurement unit 11, the leakage current detectors 12, 22, 32, 42, the voltage detectors 13, 23, 33, 43, the phase angle calculators 14, 24, 34, 44, the ground insulation resistance leakage current component calculators (leakage current component calculators) 15, 25, 35, 45, the second measurement unit 21, the third measurement unit 31, the fourth measurement unit 41, and the selection processor 51.

Here, a configuration of the processor 501 will be described. The processor 501 is, for example, a central processing unit (CPU), a micro-processing unit (MPU), a graphics processing unit (GPU), any of other various arithmetic devices, or a combination thereof.

Figure 19:
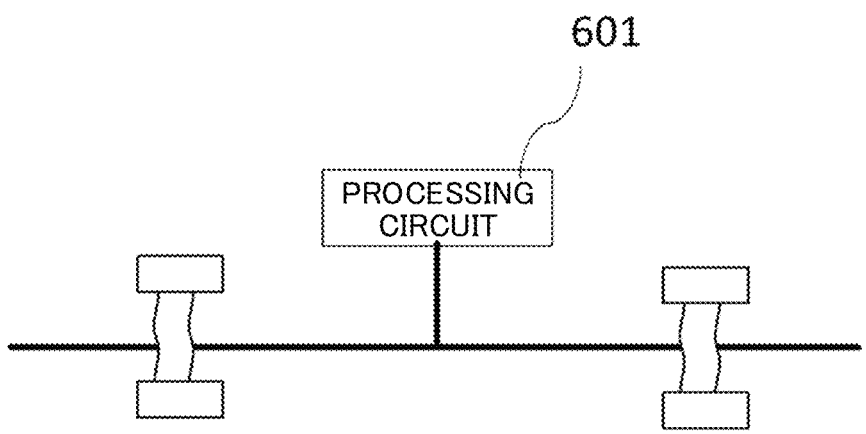
FIG. 19 is a block diagram illustrating a second configuration example of the computer.

In order to fulfill the functions and/or method described in the present disclosure, a part or all of the functions of the processor 501, the memory 502, the storage 503, and other components may be configured by a processing circuit 601 which is dedicated hardware, as shown in FIG. 19. The processing circuit 601 is, for example, a single circuit, a composite circuit, a programmed processor, a parallel-programmed processor, an application specific integrated circuit (ASIC), a field-programmable gate array (FPGA), or a combination thereof.

While the processor 501 has been described as a single component, the configuration is not limited thereto. The processor 501 may be a group of a plurality of physically separate processors. In the present specification, a program or commands included in the program has/have been described as being executed by the processor 501. The program or commands may be executed by the single processor 501 or may be distributed to a plurality of processors for execution. The program or commands included in the program, which is/are executed by the processor 501, may be executed by a plurality of virtual processors.

The communication I/F 505 conforms to a predetermined communication protocol and establishes wired or wireless communication with an external device.

In the case in which the three-phase AC output from the three-phase AC power source is converted into the single-phase AC and the load is connected to the wireway in which the single-phase AC flows, by executing the measurement program by the computer 500, the step (the above-described first measurement step to the fourth measurement step) suitable for the state (the above-described first to fourth states) of the three-phase AC power source can be selected, and the Ior of such a wireway can be accurately calculated.

In the selection processing step, the first measurement unit 11 is selected in the case of the first state in which the three-phase AC power source in which the first phase, the second phase, the third phase, and the neutral line are star-connected is connected to the wireway to be measured and the load is connected to any one of the first phase, the second phase, or the third phase and the neutral line.

In the selection processing step, the second measurement unit 21 is selected in the case of the second state in which the three-phase AC power source in which the first phase, the second phase, and the third phase are star-connected is connected to the wireway to be measured and the load is connected to any two of the first phase, the second phase, and the third phase.

In the selection processing step, the third measurement unit 31 is selected in the case of the third state in which the three-phase AC power source in which the first phase, the second phase, and the third phase are delta-connected and any one of these phases is grounded is connected to the wireway to be measured and the load is connected to the grounded phase and any one of the non-grounded phases.

In the selection processing step, the fourth measurement unit 41 is selected in the case of the fourth state in which the three-phase AC power source in which the first phase, the second phase, and the third phase are delta-connected and any one of these phases is grounded is connected to the wireway to be measured and the load is connected to the non-grounded two phases.

As the first configuration, the first measurement unit 11 calculates, according to the following equation, the leakage current component Ior caused by the ground insulation resistance included in the leakage current Io flowing in the wireway to be measured based on the phase angle θ calculated from the leakage current Io and the voltage applied between any one of the first phase, the second phase, or the third phase to which the load is connected and the neutral line:

$$Ior = Io \times \cos\theta.$$

The above-described leakage current, voltage, phase angle, and leakage current component caused by the ground insulation resistance are included in the wireway electricity related value.

As the second configuration, the second measurement unit 21 calculates, according to the following equation, the leakage current component Ior caused by the ground insulation resistance included in the leakage current Io flowing in the wireway to be measured based on the phase angle θ calculated from the leakage current Io and the voltage applied between the two phases to which the load is connected:

$$Ior = Io \times \sin\theta/\cos 60°.$$

The above-described leakage current, voltage, phase angle, and leakage current component caused by the ground insulation resistance are included in the wireway electricity related value.

As the third configuration, the third measurement unit 31 calculates, according to the following equation, the leakage current component Ior caused by the ground insulation resistance included in the leakage current Io flowing in the wireway to be measured based on the phase angle θ calculated from the leakage current Io and the voltage applied between the phases to which the load is connected:

$$Ior = Io \times \cos\theta.$$

The above-described leakage current, voltage, phase angle, and leakage current component caused by the ground insulation resistance are included in the wireway electricity related value.

As the fourth configuration, the fourth measurement unit 41 calculates, according to the following equation, the leakage current component Ior caused by the ground insulation resistance included in the leakage current Io flowing in the wireway to be measured based on the phase angle θ calculated from the leakage current Io and the voltage applied between the phases to which the load is connected:

$$Ior = Io \times \sin\theta/\cos 30°.$$

The above-described leakage current, voltage, phase angle, and leakage current component caused by the ground insulation resistance are included in the wireway electricity related value.

The measurement program is not limited to one described above, and may mainly include the following steps and be executed by the computer 500 (hardware).

Step 101: measuring a wireway electricity related value which is a value related to electricity of a wireway branched from a wireway to be measured to which a star-connected or delta-connected three-phase AC power source is connected and branched from a three-phase AC to a single-phase AC and distributed (measurement step).

Step 102: selecting one state from two or more of a first state in which a three-phase AC power source in which a first phase, a second phase, a third phase, and a neutral line are star-connected is connected to a wireway to be measured and a load is connected to any one of the first phase, the second phase, or the third phase and the neutral line, a second state in which a three-phase AC power source in which a first phase, a second phase, and a third phase are star-connected is connected to a wireway to be measured and a load is connected to any two of the first phase, the second phase, and the third phase, a third state in which a three-phase AC power source in which a first phase, a second phase, and a third phase are delta-connected and any one of the phases is grounded is connected to a wireway to be measured and a load is connected to the grounded phase and any one of the non-grounded phases, and a fourth state in which a three-phase AC power source in which a first phase, a second phase, and a third phase are delta-connected and any one of the phases is grounded is connected to a wireway to be measured and a load is connected to the non-grounded two phases (selection processing step).

In a case where the first state or the third state is selected in the selection processing step, the measurement unit 101 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between any one of the first phase, the second phase, or the third phase to which the load is connected and the neutral line:

$$Ior = Io \times \cos\theta.$$

In a case where the second state is selected in the selection processing step, the measurement unit 101 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between the two phases to which the load is connected:

$$Ior = Io \times \sin\theta/\cos 60°.$$

In a case where the fourth state is selected in the selection processing step, the measurement unit 101 calculates, according to the following equation, a leakage current component Ior caused by a ground insulation resistance included in a leakage current Io, which is one of the wireway electricity related values, flowing in the wireway to be measured based on a phase angle θ calculated from the leakage current Io and a voltage applied between the phases to which the load is connected:

$$Ior = Io \times \sin\theta/\cos 30°.$$

DESCRIPTION OF REFERENCE CHARACTERS

1 Measurement Apparatus
2 Measurement Unit
10 Zero-Phase Current Transformer (ZCT)
11 First Measurement Unit
12, 22, 32, 42 Leakage Current Detector
13, 23, 33, 43 Voltage Detector
14, 24, 34, 44 Phase Angle Calculator
15, 25, 35, 45 Ground Insulation Resistance Leakage Current Component Calculator (Leakage Current Component Calculator)
16, 26, 36, 46 Arithmetic Unit
21 Second Measurement Unit
31 Third Measurement Unit
41 Fourth Measurement Unit
51 Selection Processor

The invention claimed is:
1. A measurement apparatus comprising:
a measurement unit including any two or more of a first measurement unit configured to calculate a leakage current component caused by a ground insulation resistance based on a waveform of a leakage current detected by a first leakage current detector which detects the leakage current flowing in a wireway to be measured to which a load is connected and a waveform of a voltage detected by a first voltage detector which detects the voltage applied between two phases to which a load is connected in a wireway branched from a wireway to be measured to which a star-connected three-phase AC power source is connected or a wireway to be measured to which a three-phase circuit composed of a star-connected three-phase AC power source is connected and branched from a three-phase AC to a single-phase AC and distributed,
a second measurement unit configured to calculate a leakage current component caused by a ground insulation resistance based on a waveform of a leakage current detected by a second leakage current detector which detects the leakage current flowing in a wireway to be measured to which a load is connected and a waveform of a voltage detected by a second voltage detector which detects the voltage applied between two phases to which a load is connected in a wireway branched from a wireway to be measured to which a star-connected three-phase AC power source is connected or a wireway to be measured to which a three-phase circuit composed of a star-connected three-phase AC power source is connected and branched from a three-phase AC to a single-phase AC and distributed,
a third measurement unit configured to calculate a leakage current component caused by a ground insulation resistance based on a waveform of a leakage current detected by a third leakage current detector which detects the leakage current flowing in a single-phase circuit branched from a delta connection and a waveform of a voltage detected by a third voltage detector which detects the voltage applied between phases to which a load is connected in a wireway branched from a wireway to be measured to which a delta-connected three-phase AC power source is connected or a wireway to be measured to which a three-phase circuit composed of a delta-connected three-phase AC power source is connected and branched from a three-phase AC to a single-phase AC and distributed, and
a fourth measurement unit configured to calculate a leakage current component caused by a ground insulation resistance based on a waveform of a leakage current detected by a fourth leakage current detector which detects the leakage current flowing in the wireway to be measured to which a load is connected and a waveform of a voltage detected by a fourth voltage detector which detects the voltage applied between phases to which a load is connected in a wireway branched from a wireway to be measured to which a delta-connected three-phase AC power source is connected or a wireway to be measured to which a three-phase circuit composed of a delta-connected three-phase AC power source is connected and branched from a three-phase AC to a single-phase AC and distributed; and
a selection processor configured to select any one of the measurement units in the measurement unit.
2. The measurement apparatus of claim 1, wherein
the first measurement unit calculates the leakage current component caused by the ground insulation resistance by integration by synchronous detection based on the waveform of the leakage current detected by the first leakage current detector and the waveform of the voltage detected by the first voltage detector,
the second measurement unit calculates the leakage current component caused by the ground insulation resistance by integration by synchronous detection based on the waveform of the leakage current detected by the second leakage current detector and the waveform of voltage detected by the second voltage detector,
the third measurement unit calculates the leakage current component caused by the ground insulation resistance by integration by synchronous detection based on the waveform of the leakage current detected by the third leakage current detector and the waveform of the voltage detected by the third voltage detector, and
the fourth measurement unit calculates the leakage current component caused by the ground insulation resistance by integration by synchronous detection based on the waveform of the leakage current detected by the fourth leakage current detector and the waveform of the voltage detected by the fourth voltage detector.
3. A measurement apparatus comprising:
a measurement unit configured to measure a leakage current component caused by a ground insulation resistance based on a waveform of a leakage current detected by a first leakage current detector which detects the leakage current flowing in the wireway to be measured to which a load is connected and a waveform of a voltage detected by a first voltage detector which detects the voltage applied between two phases to which a load is connected in a wireway branched from a wireway to be measured to which a star-connected or delta-connected three-phase AC power source is connected or a wireway to be measured to which a three-phase circuit composed of a star-connected or delta- connected three-phase AC power source is connected and branched from a three-phase AC to a single-phase AC and distributed; and a selection processor configured to select one state from two or more of a first state in which a three-phase AC power source in which a first phase, a second phase, a third phase, and a neutral line are star-connected is connected to the wireway to be measured and a load is connected to any one or two of the first phase, the second phase, or the third phase and the neutral line, a second state in which a three-phase AC power source in which a first phase, a second phase, and a third phase are star-connected is connected to the wireway to be measured and a load is connected to any two or three of the first phase, the second phase, and the third phase, a third state in which a three-phase AC power source in which a first phase, a second phase, and a third phase are delta-connected and any one of the phases is grounded is connected to the wireway to be measured and a load is connected to the grounded phase and any one or two of the non-grounded phases, and a fourth state in which a three-phase AC power source in which a first phase, a second phase, and a third phase are delta-connected and any one of the phases is grounded is connected to the wireway to be measured and a load is connected to the non-grounded two or three phases, and the measurement unit calculates,
- in a case in which the selection processor selects the first state or the third state, a leakage current component caused by a ground insulation resistance included in a leakage current, flowing in the wireway to be measured based on a waveform of the leakage current and a waveform of a voltage applied between any one of the first phase, the second phase, or the third phase to which the load is connected and the neutral line,
- in a case in which the selection processor selects the second state, a leakage current component caused by a ground insulation resistance included in a leakage current flowing in the wireway to be measured based on a waveform of the leakage current and a waveform of a voltage applied between the two phases to which the load is connected, and
- in a case in which the selection processor selects the fourth state, a leakage current component caused by a ground insulation resistance included in a leakage current flowing in the wireway to be measured based on a waveform of the leakage current and a waveform of a voltage applied between the phases to which the load is connected.

4. A measurement method comprising:
selecting, in a selection processing step, any one of a plurality of arithmetic units configured to calculate, by different configurations, a leakage current component caused by a ground insulation resistance of a wireway branched from a wireway to be measured to which a star-connected or delta-connected three-phase AC power source is connected or a wireway to be measured to which a three-phase circuit composed of a star-connected or delta-connected three-phase AC power source is connected and branched from a three-phase AC to a single-phase AC and distributed, and performing, in a measurement step, measurement by the measurement unit having been selected in the selection processing step, and the plurality of measurement units includes any two or more of
- a first measurement unit configured to calculate a leakage current component caused by a ground insulation resistance based on a waveform of a leakage current detected by a first leakage current detector which detects the leakage current flowing in a wireway to be measured to which a load is connected and a waveform of a voltage detected by a first voltage detector which detects the voltage applied between two phases to which a load is connected in a wireway branched from a wireway to be measured to which a star-connected three-phase AC power source is connected or a wireway to be measured to which a three-phase circuit composed of a star-connected three-phase AC power source is connected and branched from a three-phase AC to a single-phase AC and distributed,
- a second measurement unit configured to calculate a leakage current component caused by a ground insulation resistance based on a waveform of a leakage current detected by a second leakage current detector which detects the leakage current flowing in a wireway to be measured to which a load is connected and a waveform of a voltage detected by a second voltage detector which detects the voltage applied between two phases to which a load is connected in a wireway branched from a wireway to be measured to which a star-connected three-phase AC power source is connected or a wireway to be measured to which a three-phase circuit composed of a star-connected three-phase AC power source is connected and branched from a three-phase AC to a single-phase AC and distributed,
- a third measurement unit configured to calculate a leakage current component caused by a ground insulation resistance based on a waveform of a leakage current detected by a third leakage current detector which detects the leakage current flowing in a single-phase circuit branched from a delta connection and a waveform of a voltage detected by a third voltage detector which detects the voltage applied between phases to which a load is connected in a wireway branched from a wireway to be measured to which a delta-connected three-phase AC power source is connected or a wireway to be measured to which a three-phase circuit composed of a delta-connected three-phase AC power source is connected and branched from a three-phase AC to a single-phase AC and distributed, and
- a fourth measurement unit configured to calculate a leakage current component caused by a ground insulation resistance based on a waveform of a leakage current detected by a fourth leakage current detector which detects the leakage current flowing in the wireway to be measured to which a load is connected and a waveform of a voltage detected by a fourth voltage detector which detects the voltage applied between phases to which a load is connected in a wireway branched from a wireway to be measured to which a delta-connected three-phase AC power source is connected or a wireway to be measured to which a three-phase circuit composed of a delta-connected three-phase AC power source is connected and branched from a three-phase AC to a single-phase AC and distributed.

5. A non-volatile computer readable storage storing a measurement program, wherein the measurement program is loaded by a computer to execute a measurement method of:

selecting, in a selection processing step, any one of a plurality of arithmetic units configured to calculate, by different configurations, a leakage current component caused by a ground insulation resistance of a wireway branched from a wireway to be measured to which a star-connected or delta-connected three-phase AC power source is connected or a wireway to be measured to which a three-phase circuit composed of a star-connected or delta-connected three-phase AC power source is connected and branched from a three-phase AC to a single-phase AC and distributed, and performing, in a measurement step, measurement by the measurement unit having been selected in the selection processing step, and the plurality of measurement units includes any two or more of a first measurement unit configured to calculate a leakage current component caused by a ground insulation resistance based on a waveform of a leakage current detected by a first leakage current detector which detects the leakage current flowing in a wireway to be measured to which a load is connected and a waveform of a voltage detected by a first voltage detector which detects the voltage applied between two phases to which a load is connected in a wireway branched from a wireway to be measured to which a star-connected three-phase AC power source is connected or a wireway to be measured to which a three-phase circuit composed of a star-connected three-phase AC power source is connected and branched from a three-phase AC to a single-phase AC and distributed, a second measurement unit configured to calculate a leakage current component caused by a ground insulation resistance based on a waveform of a leakage current detected by a second leakage current detector which detects the leakage current flowing in a wireway to be measured to which a load is connected and a waveform of a voltage detected by a second voltage detector which detects the voltage applied between two phases to which a load is connected in a wireway branched from a wireway to be measured to which a star-connected three-phase AC power source is connected or a wireway to be measured to which a three-phase circuit composed of a star-connected three-phase AC power source is connected and branched from a three-phase AC to a single-phase AC and distributed, a third measurement unit configured to calculate a leakage current component caused by a ground insulation resistance based on a waveform of a leakage current detected by a third leakage current detector which detects the leakage current flowing in a single-phase circuit branched from a delta connection and a waveform of a voltage detected by a third voltage detector which detects the voltage applied between phases to which a load is connected in a wireway branched from a wireway to be measured to which a delta-connected three-phase AC power source is connected or a wireway to be measured to which a three-phase circuit composed of a delta-connected three-phase AC power source is connected and branched from a three-phase AC to a single-phase AC and distributed, and a fourth measurement unit configured to calculate a leakage current component caused by a ground insulation resistance based on a waveform of a leakage current detected by a fourth leakage current detector which detects the leakage current flowing in the wireway to be measured to which a load is connected and a waveform of a voltage detected by a fourth voltage detector which detects the voltage applied between phases to which a load is connected in a wireway branched from a wireway to be measured to which a delta-connected three-phase AC power source is connected or a wireway to be measured to which a three-phase circuit composed of a delta-connected three-phase AC power source is connected and branched from a three-phase AC to a single-phase AC and distributed.

* * * * *